(12) United States Patent
Li

(10) Patent No.: US 12,301,022 B2
(45) Date of Patent: May 13, 2025

(54) LASER-BASED SYSTEM FOR PROVIDING WIRELESS POWER

(71) Applicant: Adeia Guides, Inc., San Jose, CA (US)

(72) Inventor: Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 113 days.

(21) Appl. No.: 17/977,670

(22) Filed: Oct. 31, 2022

(65) Prior Publication Data
US 2024/0146116 A1    May 2, 2024

(51) Int. Cl.
*H02J 50/30*  (2016.01)
*H02J 7/35*   (2006.01)

(52) U.S. Cl.
CPC ............... *H02J 50/30* (2016.02); *H02J 7/35* (2013.01)

(58) Field of Classification Search
None
See application file for complete search history.

(56) References Cited

U.S. PATENT DOCUMENTS

| | | | | |
|---|---|---|---|---|
| 2016/0079810 A1* | 3/2016 | Frantz | ..................... | H02S 40/38 307/104 |
| 2016/0087484 A1* | 3/2016 | Kim | ...................... | H02J 50/30 320/101 |
| 2017/0179771 A1* | 6/2017 | Leabman | ................ | H02J 50/30 |
| 2017/0346347 A1* | 11/2017 | Abiri | ........................ | H02J 50/30 |
| 2018/0123403 A1* | 5/2018 | Kare | ....................... | G01S 17/89 |
| 2020/0185966 A1* | 6/2020 | Asanuma | ................ | H02J 50/40 |
| 2020/0403456 A1* | 12/2020 | Louis | ..................... | H02J 50/10 |

* cited by examiner

*Primary Examiner* — Jared Fureman
*Assistant Examiner* — Joel Barnett
(74) *Attorney, Agent, or Firm* — Haley Guiliano LLP

(57) ABSTRACT

Systems and methods for providing wireless power are described herein. A plurality of lasers may provide laser power to an array of laser absorbing elements. A laser of the plurality of lasers is assigned to a laser absorbing element of the array of laser absorbing elements. Portions of the laser absorbing element that are within a line of sight of the assigned laser are identified. The assigned laser scans the identified portions of the laser absorbing element to provide the laser power to the laser absorbing element. The laser absorbing element converts the laser power to electrical power. Electrical power from the laser absorbing elements may provide electrical power to a device.

19 Claims, 15 Drawing Sheets

LASER-BASED SYSTEM FOR PROVIDING WIRELESS POWER

BACKGROUND

This disclosure is directed to systems and methods for providing wireless power and in particular using a laser to transmit power to a laser absorbing element.

SUMMARY

Providing power wirelessly is becoming increasingly popular as a means of charging different devices, such as cell phones. Wireless power may remove the need for charging cables or electrical wiring, which may allow charging of multiple types of devices or simplify installation of devices requiring power. However, wireless charging may have limitations for certain applications, such as providing power to a high powered and/or moving device, such as a robot, a phone, a clock, a radio, an electronic lock, an augmented reality (AR) or virtual reality (VR) headset, or any device requiring power that may not have a power source available.

AR or VR headsets (referred to as headsets) may have powerful graphical processing units (GPUs) that require high power. For example, headsets may require about 10 W of power to operate. In one approach, batteries may be used to provide power to the headsets and allow them to move, but an amount of power provided to the GPU may be limited to promote longer battery life, which can reduce performance of the headsets. Other devices, such as clocks and electronic locks may not have a power source, such as an electrical outlet, available to power the device. In one approach, batteries may be used to provide power, but the batteries may die rendering the clock or electronic lock unusable or need to be monitored to determine a remaining battery life. Thus, a better means of providing wireless power to devices is needed.

In one approach, electromagnetic induction may be used to wirelessly provide power. However, this approach requires that the device being powered be close to or touching the induction power supply. This is not feasible for moving devices such as headsets. Electromagnetic induction may also be limited in the amount of power that can be provided and may not be able to power high-powered devices.

In another approach, solar panels may be used to provide power. Solar panels are used outdoors and convert sunlight into electricity. But solar panels require the sunlight and are not suitable for use indoors. Further, several solar panels may be required to provide power to higher power devices. Using several solar panels may be impractical for moving devices since the solar panels would need to move with the device or be tethered to the device via a wire or cable.

In another approach, an infrared (IR) laser beam may be used to provide power. The device being powered may be connected to a receiver and the IR laser beam may be directed to a point on the receiver. The receiver may use the IR laser energy to provide power to a device. However, the IR laser beam may not be able to move or to track the receiver on a moving device. The IR laser beam may also be limited in power, such as limited to 250 mW, to comply with laser safety requirements. For example, an irradiance of the IR laser may be limited to be no more than a maximum permissible exposure (MPE) for the IR laser, which may be 0.25 W/cm$^2$. If the laser has a power of 250 mW (0.25 W) and an area of a beam of the IR laser is 1.1 cm$^2$, then the irradiance is about 0.23 W/cm$^2$. Because the irradiance is less than the MPE, the IR laser may be considered safe to use. But, the limited power provided by the IR laser may not be enough to power high-powered devices such as headsets. Other example MPE values that may be suitable include 0.2 W/cm$^2$, 0.3 W/cm$^2$, 0.4 W/cm$^2$, and 0.5 W/cm$^2$. Depending on the embodiment, an MPE value below 0.2 W/cm$^2$ or above 0.5 W/cm$^2$ may be used.

In another approach, a system having a high-powered laser may be used to provide power. The high-powered laser may provide 1 W or more to a stationary receiver. A laser beam of the high-powered laser may not be considered safe for humans if pointed at a stationary location. To mitigate harm to humans, an array of low-powered lasers may surround the high-powered laser beam and the high-powered laser may turn off if a beam of any of the low-powered lasers is broken or contacts an object or person. However, the high-powered laser beam, which is pointed at a fixed point on the stationary receiver, may generate a lot of heat in the stationary receiver when used over time. Thus, the high-powered laser may be used for short durations to prevent overheating the stationary receiver.

The stationary receiver may also require a heat sink, which may limit how the high-powered laser and heat sink are used. For example, the heat sink may require a dimension that is not suitable for certain applications such as use on a garment. The heat sink may also be made of a rigid material that does not move or flex. Further, the high-powered laser system may not be suitable for applications where the receiver is not stationary. Coordinating movement of the high-powered laser and the array of low-powered lasers to track a moving receiver may be challenging, and misalignment or errors in tracking may cause the high-powered laser to be directed at unintended objects (e.g., flammable or combustible objects or humans), thus compromising the safety of the system.

Accordingly, there is a need to provide power wirelessly to a high-powered device that moves. Such a solution leverages the high-power capability of lasers with the sophisticated motion tracking capabilities of cameras (e.g., of cameras in modern mobile devices) in order to create an improved wireless power system.

To solve these problems, systems and methods are provided herein for providing power wirelessly to a non-stationary device requiring high-power, where safety is considered since the device may be near humans.

In one approach, a wireless power system may include a plurality of lasers that provide power to an array of laser absorbing elements. A laser of the plurality of lasers is assigned to a first laser absorbing element of the array of laser absorbing elements. Portions of the first laser absorbing element that are within a line of sight of the assigned laser are identified. The assigned laser scans the identified portions of the first laser absorbing element with a laser beam to provide power to the first laser absorbing element. Scanning the identified portions may allow a high-powered laser beam to provide power to a larger area than if the high-powered laser were directed to a fixed point. The larger area reduces an irradiance of the laser beam and may increase safety of the wireless power system. Thus, a higher-powered laser may be used to scan the laser absorbing elements than a laser used to focus on a fixed point of the laser absorbing elements. Scanning the larger area may also reduce a size of a heat sink or eliminate the heat sink because the heat is spread out over a larger area and may dissipate faster.

In some embodiments, the assigned laser is assigned based on determining that the first laser absorbing element is not assigned to another laser of the plurality of lasers. In some embodiments, a camera is used to identify the portions of the first laser absorbing element that are within a line of sight of the assigned laser. In some embodiments, the laser absorbing elements are used to provide power to a headset or charge a battery of the headset. The laser absorbing elements may be connected in series to add power provided by each laser absorbing element to provide power for the headset. Connecting several laser absorbing elements in series may increase safety of the wireless power system. For example, the laser absorbing elements may provide more power in a safer manner than directing a high-powered laser at a fixed point on a laser absorbing element.

In another approach, the array of laser absorbing elements moves, and the lasers move accordingly to continue to scan the laser absorbing elements. In some embodiments, the camera is used by a system controller to track a position of each laser absorbing element and move the lasers accordingly. The system controller may identify each laser absorbing element of the array of laser absorbing elements and ensure only one laser is assigned to each laser absorbing element. Having only one laser scan a laser absorbing element may increase safety by reducing a total irradiance per a scan area. System performance may also improve since the laser absorbing elements absorb energy and heat from only one laser.

In some embodiments, the system controller may use the camera to track the laser absorbing elements. For example, the system controller may use the camera to track a border of each laser absorbing element or track markers or fiducials on each laser absorbing element. Tracking the laser absorbing elements may allow the wireless power system to provide power while the laser absorbing elements are moving, which may increase a power outputted by the laser absorbing elements. In some embodiments, the camera may be used to detect whether a human is present, or track a position of the human and detect if a vulnerable part of a human, such as an eye, will be contacted by any of the lasers. The system controller may disable power to the lasers, reposition any of the lasers, or decide which laser absorbing elements to focus the lasers on based on the camera. Using the camera to avoid vulnerable parts of humans allows the wireless power system to deliver power safely when humans are present.

In some embodiments, the lasers may be turned off if the lasers or the laser absorbing elements become too hot. For example, the lasers may include a thermal sensor (e.g., a temperature sensor) to report a temperature of the lasers. The system controller may turn off the lasers, or a laser of the lasers, if the temperature exceeds a temperature threshold. Similarly, the laser absorbing elements may include a thermal sensor and the laser absorbing elements may be turned off if the temperature exceeds a temperature threshold, such as while the lasers are scanning the laser absorbing elements. In some embodiments, the lasers and the laser absorbing elements may each have a timeout. For example, if a laser is scanning a laser absorbing element for at least a minimum time threshold, the laser may "timeout." The system controller may turn off the laser for a predetermined period of time or until the laser reaches a cooldown temperature threshold. Similarly, the laser absorbing elements may "timeout" if scanned for a minimum time threshold. The system controller may turn off the laser that is scanning the timed-out laser absorbing elements or reassign the laser to a different laser absorbing element. The laser absorbing elements may become available to scan after a predetermined period of time or when they reach a cooldown temperature threshold. The timeouts may prevent the lasers and the laser absorbing elements for overheating, or from overuse.

Using the methods described herein, the wireless power system may track the laser absorbing elements, which may move. For example, the laser absorbing elements may be attached to a garment, such as a vest, that is worn by a user of the headset. The user may move about a space while using the headset. The wireless power system may be used to charge or power the headset using lasers. The system controller may use the position of the laser absorbing elements to scan the laser absorbing elements with the lasers while they move.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
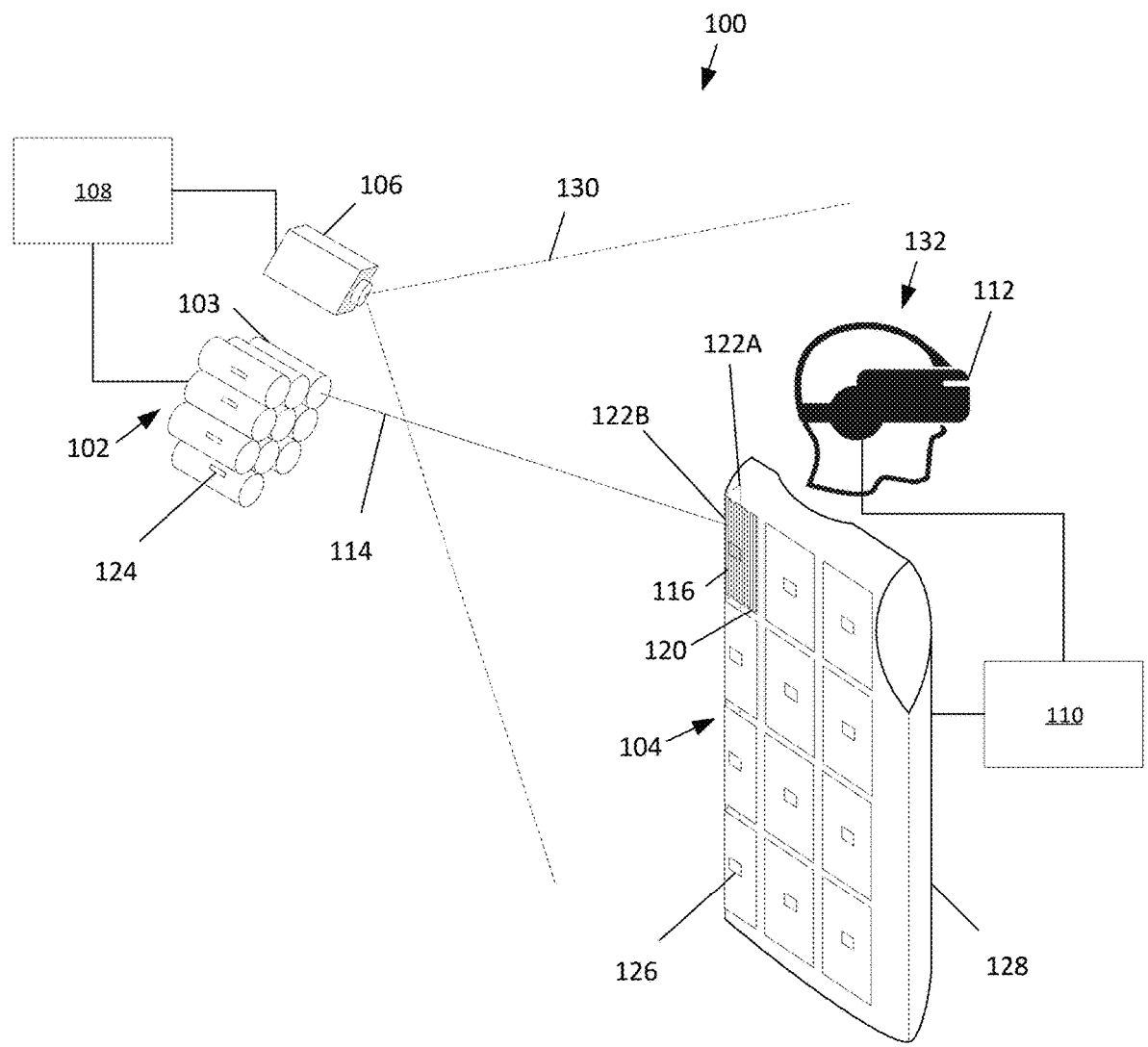
FIG. 1 shows an exemplary implementation of a laser wireless power system, in accordance with some embodiments of this disclosure.

FIG. 1 shows an exemplary implementation of a laser wireless power system 100, in accordance with some embodiments of this disclosure.

The laser wireless power system 100 (referred to as the system 100) includes a plurality of lasers 102, an array of laser absorbing elements 104, a tracking device such as a camera 106, laser circuitry 108, and absorbing element circuitry 110. The system 100 may be used to power a device, such as a virtual reality (VR) headset 112 or an augmented reality (AR) headset (not shown). In some instances, the term "extended reality" (XR) is used as a catch-all term to refer to VR, AR. The lasers 102 scan the laser absorbing elements 104 with a laser beam 114 according to a scan path 116. The VR headset 112 is electrically coupled to the laser absorbing elements 104 through the absorbing element circuitry 110. The laser absorbing elements 104 convert laser power to electrical power to power the VR headset 112, either directly or through a battery that is charged by the electrical power.

The lasers 102 are arranged in a three-by-three configuration with an additional laser 102 underneath the bottom row, although other arrangements or configurations may be used. The lasers 102 may include any type of laser capable of providing power to the VR headset 112. In some embodiments, the VR headset may require a power amount between 1 to 20 W, such as between 5 to 15 W, such as between 7.5 to 12.5 W, such as between 9 to 11 W. These power ranges are used for the depicted embodiment, but other power ranges may be contemplated based power requirements of the device being powered by the system 100. The lasers 102 may include pulsed or continuous-wave lasers that may have different wavelengths. Each laser of the lasers 102 (e.g., an assigned laser 103) includes a laser temperature sensor 124. In the depicted embodiment, the lasers 102 have a wavelength between 700 nm and 1 mm (e.g., IR), such as between 700 and 1400 nm (e.g., near-IR) or between 1400 nm and 1 mm (e.g., far-IR). In some embodiments, the lasers may have a wavelength between 400 and 700 nm (e.g., visible light) or between 180 and 400 nm (e.g., ultraviolet).

The laser absorbing elements 104 are depicted as rectangles and may include photovoltaic (PV) cells, such as high-efficiency PV cells, that are suitable for use with lasers. The high-efficiency PV cells allow the laser absorbing elements 104 to generate more electrical power per a given surface area than non-high-efficiency PV cells, which allows the system 100 to use less PV cells. Each laser 102 of the lasers 102 may be assigned to a laser absorbing element 104 of the laser absorbing elements 104 based on a determination that the laser 102 is not assigned to more than one laser absorbing element 104. For example, the assigned laser 103 may be assigned to a laser absorbing element 120 if the assigned laser 103 is not assigned to another laser absorbing element 104.

The laser absorbing elements 104 may be attached to smaller objects or a garment, such as a vest 128. A user 132 may wear the vest 128 while using the VR headset 112, allowing the laser absorbing elements 104 to move with the user 132. In particular, the laser absorbing elements 104 may attach to a back of the vest to reduce a risk of the lasers 102 contacting an eye of the user 132 when scanning the laser absorbing elements 104. The laser absorbing elements 104 may comprise silicone and may be flexible to allow bending or elastic deformation if the vest 128 wrinkles, flaps, waves, or otherwise moves. The laser absorbing elements 104 may have a conversion efficiency rate of at least 50%, such as at least 60%, such as at least 65%, such as at least 67.5%. The efficiency of the laser absorbing elements 104 may determine the electrical power generated by laser beam 114. In some embodiments, the laser absorbing elements 104 may include III-V solar cells.

Staying with FIG. 1, the laser circuitry 108 controls power to the lasers 102, controls movement of the laser beam 114 such as when the laser beam 114 scans the laser absorbing elements 104, and uses the laser temperature sensors 124 to monitor a temperature of the lasers 102. The laser circuitry may use a micro-electro-mechanical system (MEMS) chip to move the laser beam 114. For example, scanning MEMS mirrors may be used to direct the laser beams 114 to the laser absorbing elements 104 and to scan the laser absorbing elements 104. The laser circuitry 108 uses the laser temperature sensors 124 to prevent the lasers 102 from overheating by monitoring a temperature of the lasers 102. If the temperature exceeds a predetermined temperature threshold (e.g., a laser temperature threshold), the laser circuitry 108 may turn off the lasers 102 exceeding the threshold. For example, the assigned laser 103 may be turned off before it overheats. The temperature sensors 124 may measure the temperature at different locations of the lasers 102, including a laser source (e.g., a laser diode) and the laser circuitry 108.

The laser circuitry 108 also uses a timeout to determine if the lasers 102 have scanned the laser absorbing elements 104 for predetermined period of time (e.g., a first minimum time threshold). If the timeout is exceeded, the laser circuitry 108 stops the "timed out" lasers 102 from scanning. For example, if the assigned laser 103 has scanned a laser absorbing element 120 for more than the first minimum time threshold, the assigned laser may be turned off to allow it time to cool down.

The absorbing element circuitry 110 controls disbursement of the electrical power generated by the laser absorbing elements 104. For example, the absorbing element circuitry 110 may modulate the electrical power by reducing a voltage or wattage provided to the VR headset 112 or ensuring the voltage or wattage is constant. The absorbing element circuitry 110 uses the absorbing element temperature sensors 126 to determine if the laser absorbing elements 104 are overheating or to prevent the laser absorbing elements 104 from overheating. If the temperature of the laser absorbing elements 104 exceeds a predetermined temperature threshold (e.g., an element temperature threshold), the absorbing element circuitry 110 communicates with the laser circuitry 108 to stop the lasers 102 from scanning the laser absorbing elements 104 exceeding the threshold. In the embodiment depicted in FIG. 1, the absorbing element temperature sensors 126 are shown as being a portion of a size of the laser absorbing elements 104. In some embodiments, the absorbing element temperature sensors 126 may be sized to determine the temperature of the entire surface area of the laser absorbing elements 104. In some embodiments, multiple absorbing element temperature sensors 106 may be used for each laser absorbing element 104.

Scanning the laser absorbing element 120 with the assigned laser 103, instead of directing the assigned laser 103 to a point on the laser absorbing element 120, dissipates heat imparted from the assigned laser 103 and may eliminate the need for a heat sink on the laser absorbing element 120. In some embodiments, several absorbing element temperature sensors 126 may be used per each laser absorbing element 104 (e.g., the laser absorbing element 120) to sense a temperature of areas the laser beam 114 may contact.

The laser circuitry 108 also uses a timeout to determine if the laser absorbing elements 104 have been scanned by the lasers 102 for predetermined period of time (e.g., a second minimum time threshold), which may differ than the first minimum time threshold of the lasers 102. The laser circuitry 108 stops the lasers 102 from scanning the "timed out" laser absorbing elements 104 if the timeout is exceeded. For example, if the assigned laser 103 has scanned the laser absorbing element 120 for more than the second minimum time threshold, the assigned laser 130 may be assigned to a different laser absorption element 104 or turned off to allow the laser absorbing element 130 time to cool down.

The camera 106 may be a still camera or a video camera having a field of view 130. Generally, the laser absorbing elements 104 remain in the field of view 130 while the system 100 is operational. If a laser absorbing element 104 (e.g., the laser absorbing element 120) leaves the field of view 130, the absorbing element circuitry 110 communicates with the laser circuitry 108 to stop the lasers 102 from scanning the laser absorbing elements 104, or portions of the laser absorbing elements 104, outside of the field of view 130.

In some embodiments, the camera 106 may be a still camera that captures an image of the laser absorbing elements 104. The laser circuitry 108 may use the image to determine how many laser absorbing elements 104 are in the field of view 130 and to determine if any portions of the laser absorbing elements 104 are obstructed from the field of view 130 or a line of sight of the lasers 102 (e.g., a line of sight of the laser beam 114). For example, the laser circuitry 108 identifies portions of the laser absorbing element 120 within a line of sight of the assigned laser 103. The obstructed portions are referred to as obstructed portions 122A. Portions of the laser absorbing elements 104 within the field of view 130 and the line of sight of the laser beam 114 are referred to as unobstructed portions 122B. The unobstructed portions 122B form an area of the laser absorbing elements 104 scanned by the lasers 102 (e.g., a scan area). In the depicted embodiment, the field of view 130 aligns with the line of sight of the lasers 102 such that the lasers 102 may scan anywhere within the field of view 130. In some embodiments, the field of view 130 may be larger than areas within the line of sight, or vice versa.

Referring still to FIG. 1, in some embodiments, the camera 106 may be a still camera or video camera that takes several images or frames containing the laser absorbing elements 104. The laser circuitry 108 compares the images to determine if the laser absorbing elements 104 are moving. For example, for each image or frame, the laser circuitry 108 may determine (i) how many laser absorbing elements 104 are in the field of view 130, (ii) a position of each laser absorbing element 104, (iii) an orientation of each laser absorbing element 104, and/or (iv) if the laser absorbing elements 104 have obstructed portions 122A. If any of (i)-(iv) change between images, the laser absorbing elements 104 may be moving. If the laser absorbing elements 104 are moving, the laser circuitry 108 uses the image comparison to track the laser absorbing elements 104 as they move through the field of view 130, and to update or re-determine the unobstructed portions 122B.

In some embodiments, the camera 106 may be an infrared (IR) camera 106 that determines the temperature of the laser absorbing elements 104. In some embodiments, the IR camera 106 may be used in combination with the absorbing element temperature sensors 126 to determine the temperature of the laser absorbing elements 104. In some embodiments, the IR camera 106 may be used instead of the absorbing element temperature sensors 126. In some embodiments, the camera 106 may be a non-IR camera (e.g., optical camera). In such embodiments, an IR camera (not shown) may be used in addition to the non-IR camera 106 and may connect to the laser circuitry 108.

In some embodiments, the camera 106 may include an integrated inertial measurement unit (IMU) and/or a depth sensor to orient the camera and determine a position of the laser absorbing elements 104.

In some embodiment, there are more laser absorbing elements 104 than lasers 102 (i.e., twelve laser absorbing elements 104 and ten lasers 102). A subset of the laser absorbing elements 104 (e.g., ten of the laser absorbing elements 104) may create enough electrical power for the VR headset 112. An unused subset of the laser absorbing elements 104 (e.g., the remaining two) may be used as spares or reserves in case a laser absorbing element 104 malfunctions, overheats, or has an unobstructed portion 122B below a threshold surface area.

In some embodiments, low-powered lasers 102 may be used that are directed to the laser absorbing elements 104. The low-powered lasers 102 may be directed to a point on each laser absorbing element 104 instead of scanning laser absorbing elements 104. The low-powered lasers 102 may be considered safe for use around humans. For example, the low-powered lasers may cause no harm or minimal harm to humans and may include Class 1, 1M, 2, 2M, or 3R lasers.

Figure 2A:
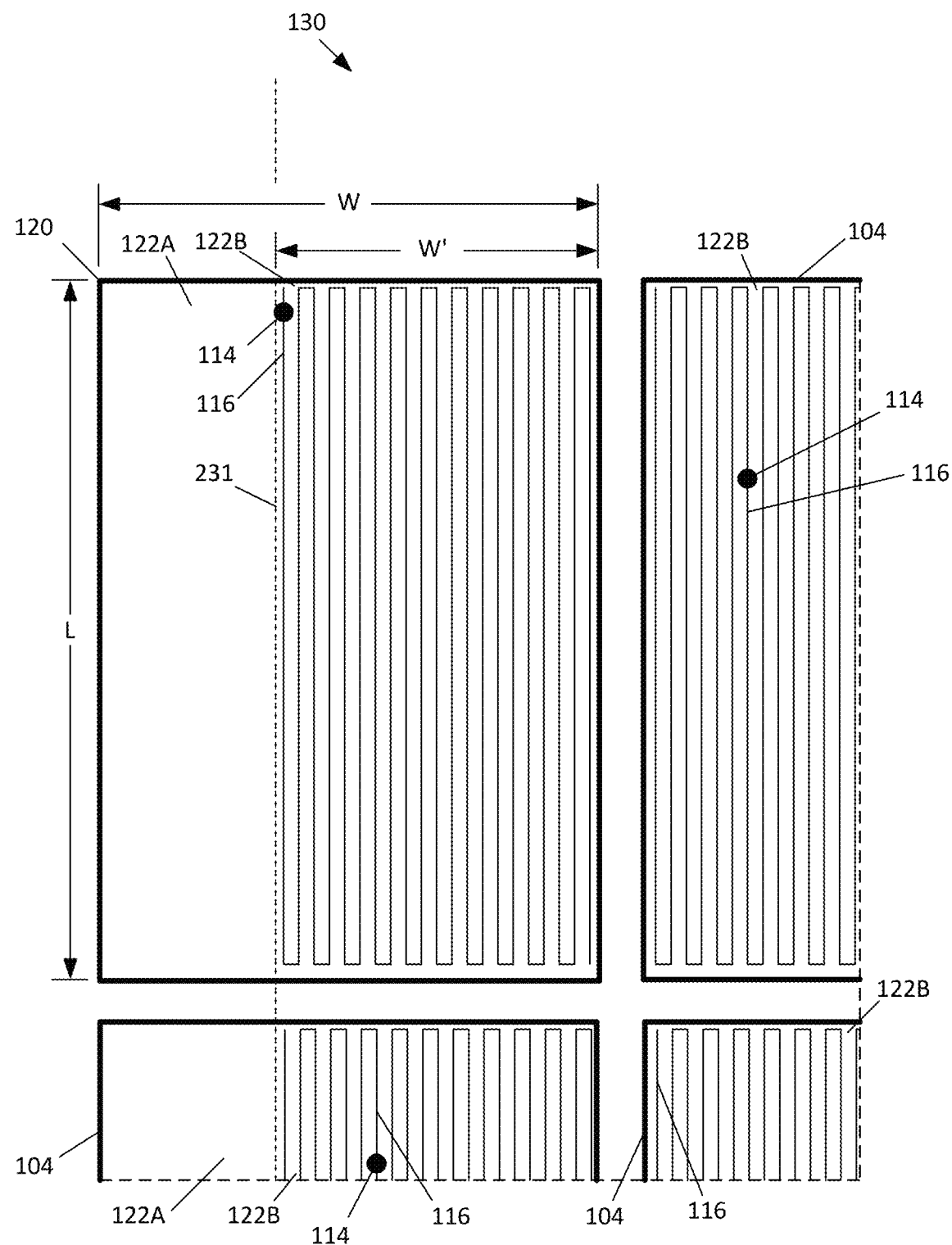
FIG. 2A shows an exemplary implementation of a laser absorbing element, in accordance with some embodiments of this disclosure.

FIG. 2A shows an exemplary implementation of the laser absorbing element 120, in accordance with some embodiments of this disclosure. As already suggested, the laser absorbing element 120 may be assigned a laser (e.g., the laser 103). The laser absorbing element 120 may receive or absorb laser power from the laser, which it may convert to electrical power (e.g., used to power a headset such as the VR headset 112). The laser absorbing element 120 has a length (L) and a width (W). In the depicted embodiment, the laser absorbing element 120 includes obstructed portion 122A and unobstructed portion 122B. The unobstructed portion has the length (L) but has an unobstructed width (W') that is shorter than the width (W). The laser beam 114 of the assigned laser 103 (FIG. 1) traverses the unobstructed portion 122B of the laser absorbing element 120 via the scan path 116. The scan path 116 is shown as a raster pattern having a series of sequential longitudinal lines along the length (L) of the unobstructed portion 122B. The scan path 116 transitions between the longitudinal lines along short, lateral lines that connect ends of the longitudinal lines such that the scan path 116 forms a continuous path, such as an "S" path, "zig zag" path, or serpentine path. The lateral lines are along a portion of the unobstructed width (W') of the unobstructed portion 122B. The laser circuitry 108 (FIG. 1) may move the laser beam 114 along the scan path 116 using raster MEMS mirrors.

FIG. 2A shows other laser absorbing elements 104 having unobstructed portions 122B and obstructed portions 122A. Scan paths 116 and laser beams 114 are shown in the unobstructed portions 122B. A boundary 231 of the field of view 130 is shown as a short-dashed line, and separates the obstructed and unobstructed portions 122A and 122B. The laser circuitry 108 may determine the boundary 231 and a surface area within the boundary.

The laser circuitry 108 may stop the assigned laser 103 from providing power to laser absorbing element 120 and reassign the assigned laser 103 to a different laser absorbing element 104 based on a surface area of the unobstructed portion 122B. For example, if the surface area of the unobstructed portion 122B of the laser absorbing element 120 is below the threshold surface area, the laser absorbing element 120 may not be able to generate enough electrical power in its current position. The assigned laser 103 may be reassigned to the different laser absorbing element 104 within a line of sight based on a determination that the different laser absorbing element 104 is not assigned to another laser 102. The reassignment may also be based on an unobstructed portion 122B of the different laser absorbing element 104 being above the threshold surface area.

In some embodiments, the laser circuitry 108 may reassign the assigned laser 103 if (i) electrical power provided by the unobstructed portion 122B is below a threshold element electrical power, or (ii) total electrical power provided by the laser absorbing elements 104 is below a threshold total electrical power. The absorbing element circuitry 110 may monitor the element electrical power produced by each laser absorbing element 104 and communicate this information to the laser circuitry 108. In such embodiments, the assigned laser 103 may be reassigned to generate more electrical power.

When the laser beam 114 scans the laser absorbing elements 104, the laser power is spread out over the surface area of the laser absorbing elements 104, and in particular, the surface area of the unobstructed portions 122B. Thus, a high-powered laser (e.g., a 1 W laser) may be used without harming a human. For example, if an unobstructed laser absorbing element 104 is 50 mm×100 mm, the scan area of the laser absorbing element 104 is 5000 mm$^2$. The irradiance, which is laser power over scan area (e.g., 1 W/5000 mm$^2$), is 0.0002 W/mm$^2$ (or 20 mW/cm$^2$). The irradiance can be used to determine how much power could potentially enter a human eye pupil, which is 7 mm$^2$, by multiplying the irradiance by the pupil size (e.g., 0.0002 W/mm$^2$×7 mm$^2$). In this example, the power entering the eye pupil is 0.0014 W (or 1.4 mW). If the laser beam 114 is from a visible light laser, the laser is considered a Class 3R laser, which can be safe to use around humans. The irradiance can also be compared to a maximum permissible exposure (MPE), which may be determined based on exposure times and the laser type, to ensure the irradiance is lower than the MPE. In an embodiment, the MPE may be any value selected from a range of 0.1 W/cm$^2$ to 0.4 W/cm$^2$ (e.g., 0.25 W/cm$^2$). Depending on the embodiment, an MPE value outside this range may be used.

In some embodiments, the laser beams 114 may scan the scan paths 116 at a scan speed that is based on a thermal dissipation of the laser absorbing elements 104. For example, the faster the laser absorbing elements 104 may dissipate heat, the slower the scanning speed of the laser beams 114 may be, and vice versa. In some embodiments, the scanning speed is based on the scan path 116, which may be based on a length or width of the laser absorbing elements 104. For example, the longer the length of the longitudinal lines, the slower the scanning speed of the laser beams 114 may be, and vice versa. Heat from the laser beams 114 may be spread over the longer lengths and may dissipate between passes along the longitudinal lines.

In some embodiments, the scan paths 116 may be based on a distance between the lasers (FIG. 1) and the laser absorbing elements 104. For example, the laser beams 114 may have an angle of divergence and a size or area of the laser beams 114 may increase as the distance between the assigned laser 103 (FIG. 1) and the laser absorbing element 120 increases. Thus, at increased distances, the laser beams 114 may require a larger distance between longitudinal lines. In some embodiments, the scan paths 116 may be based on a beam profile of the laser beams 114. For example, a Gaussian laser beam 114 has a higher intensity in a center of the laser beam 114 than at a perimeter or outside of the laser beam 114. In such embodiments, the scan paths 116 may result in overlap of an area scanned by the laser beam 114. An amount of overlap may be based on the intensity in overlapping areas. In such embodiments, the scan paths 114 may overlap as much as 50% of the laser beam 114 size (e.g., a beam width or beam height), such as much as 40%, such as much as 30%, such as much as 20%. In another example, a "p-hat" laser beam 114 has a constant intensity across the size or area of the laser beam 114. In such embodiments, the scan paths 114 may not overlap the area scanned by the laser beam 114, or may minimally overlap, such as 5% or less of the laser beam 114 size, such as 2% or less, such as 1% or less.

Figure 2B:
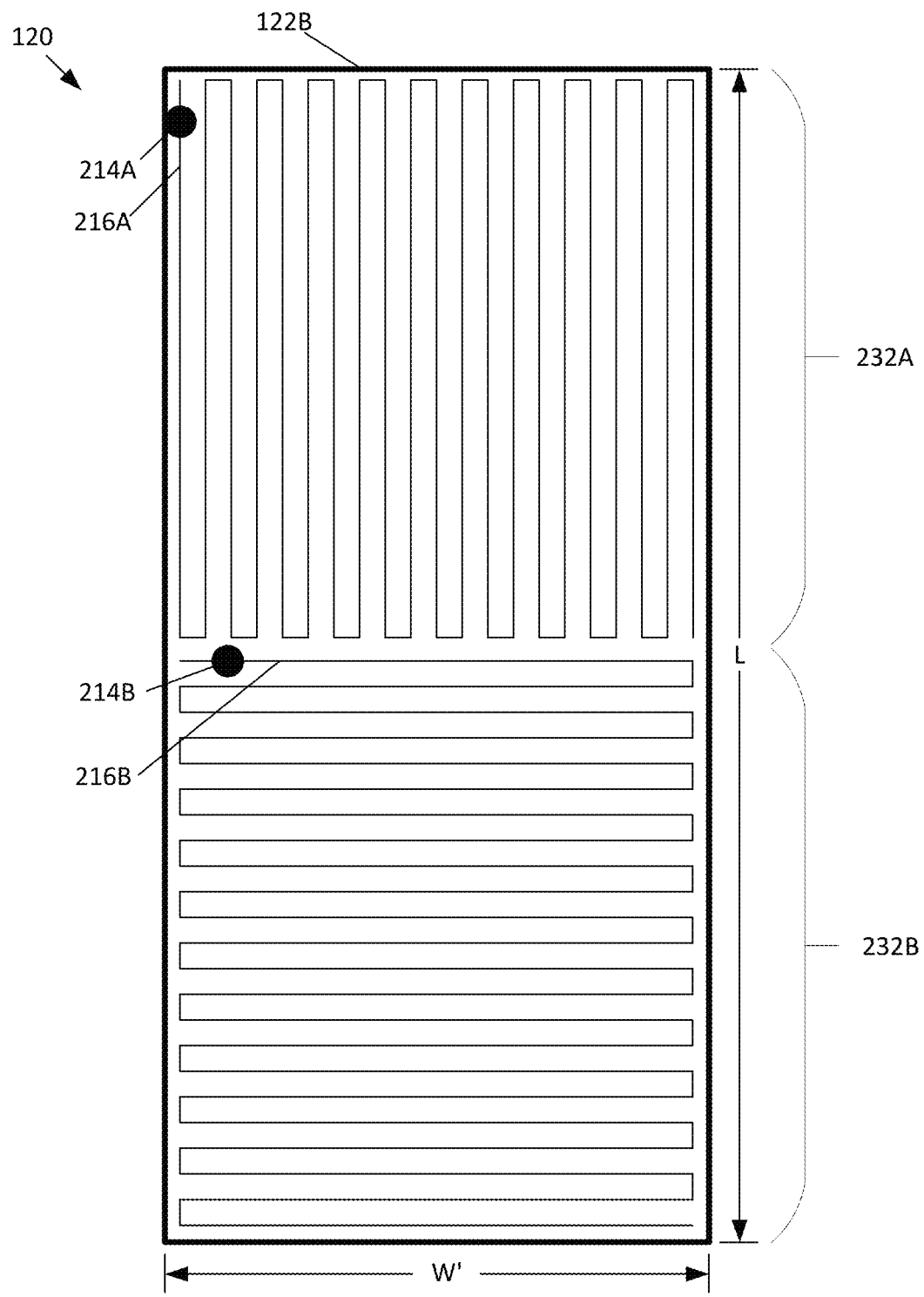
FIG. 2B shows an exemplary implementation of a laser absorbing element, in accordance with some embodiments of this disclosure.

FIG. 2B shows an exemplary implementation of the laser absorbing element 120, and in particular the unobstructed portion 122B of the laser absorbing element 120, in accordance with some embodiments of this disclosure. The unobstructed portion 122B includes multiple scan paths (e.g., a first scan path 216A and a second scan path 216B) for multiple laser beams (e.g., a first laser beam 214A and a second laser beam 214B).

The first scan path 216A is shown as covering an upper area 232A of the unobstructed portion 122B. The first scan path 216A includes a series of sequential longitudinal lines along a portion of the length (L) of the unobstructed portion 122B and lateral lines that connect ends of the longitudinal lines. The longitudinal lines of the first scan path 216A are shown measuring about half the length (L), but may measure smaller and larger portions of the length (L) in other embodiments. The second scan path 216B is shown as covering a lower area 232B of the unobstructed portion 122B (e.g., an area outside of the upper area 232A). The second scan path 216B includes a series of sequential lateral lines along the unobstructed width (W') and longitudinal lines that connect ends of the lateral lines.

The first laser beam 214A traverses the first scan path 216A and the second laser beam 214B traverses the second scan path 216B to collectively cover a surface area of the unobstructed portion 122B. In some embodiments, the first and second scan paths 216A and 216B may allow the system 100 (FIG. 1) to simultaneously use the first and second laser beams 214A and 214B having a lower laser power than the laser beam 114 discussed in relation to FIGS. 1 and 2A. For example, the laser power of the first and second laser beams 214A and 214B may sum to roughly equal the laser power of the laser beam 114, such as within 10%, such as within 5%, such as within 2%, such as within 1%. In some embodiments, the first and second scan paths 216A and 216B may be oriented based on a thermal dissipation of the laser absorbing element 120, such as discussed in relation to FIG. 2A. The first and second scan paths 216A and 216B may be oriented to allow heat imparted from the first and second laser beams 214A and 214B to dissipate. For example, the first and second scan paths 216A and 216B may be positioned such that the first and second laser beams 214A and 214B do not overlap a same location, or do not build up heat in the same location.

Figure 2C:
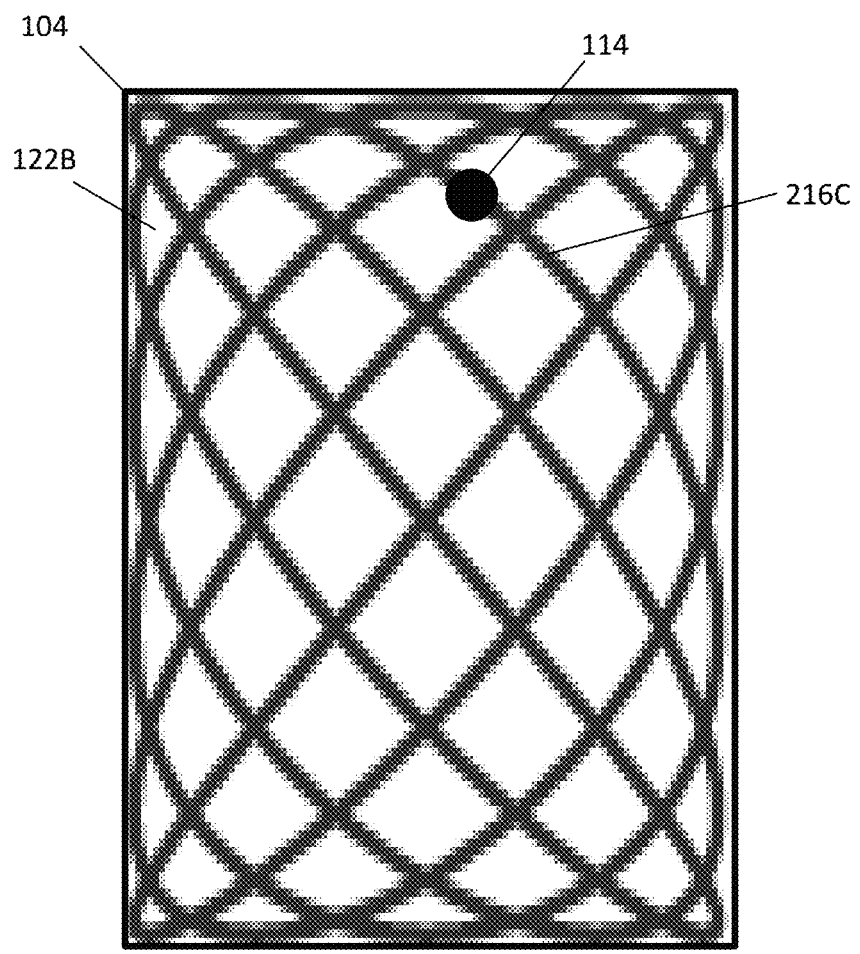
FIG. 2C shows another exemplary implementation of a laser absorbing element, in accordance with some embodiments of this disclosure.

FIG. 2C shows another exemplary implementation of the laser absorbing element 104, in accordance with some embodiments of this disclosure. The laser beam 114 scans the laser absorbing element 104 according to a scan path 216C, which is different than the raster scan path 116 (FIGS. 1 and 2A). The scan path 216C is a Lissajous pattern or curve that traverses a surface area of the laser absorbing elements 104. Scanning according to a Lissajous curve may result in a smooth scan path 216C that covers an entirety of the unobstructed portion 122B. The laser circuitry 108 (FIG. 1) may move the laser beam 114 along the scan path 216C using Lissajous MEMS mirrors, which may move the laser beam 114 at a higher frequency than the raster MEMS mirrors discussed in relation to FIG. 2A, in part because of the smooth scan path 216C. The Lissajous MEMS mirrors may allow the laser beam 114 to scan the surface area faster than the raster MEMS mirrors discussed in relation to FIG. 2A.

Although different scan paths 116 and 216A-C are discussed in relation to FIGS. 1-2C, other scan paths may be used. In some embodiments, a spiral scan path may be used. In some embodiments, a random scan path may be used.

Figures 2D, 2E:
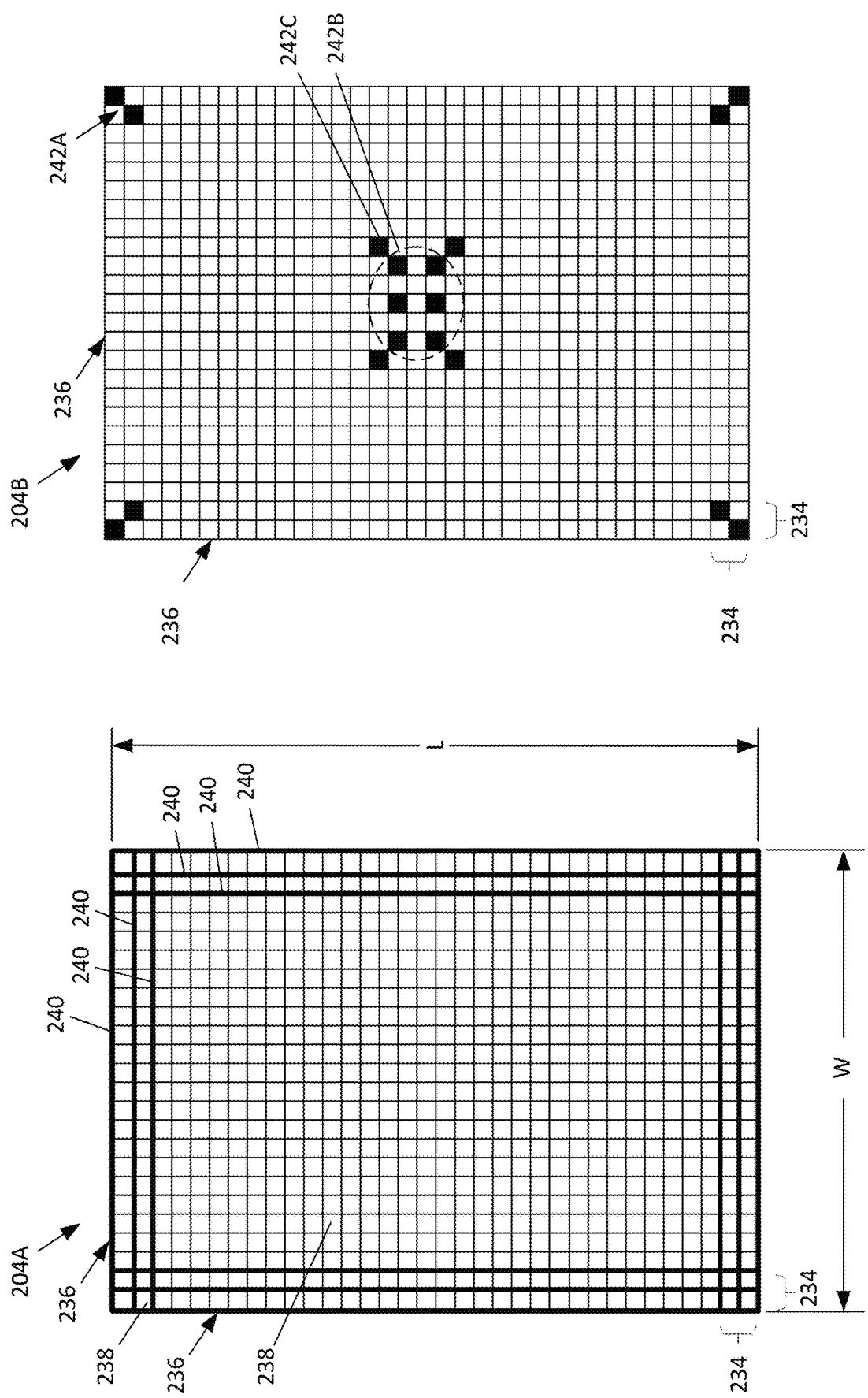
FIG. 2D shows another exemplary implementation of a laser absorbing element, in accordance with some embodiments of this disclosure.
FIG. 2E shows another exemplary implementation of a laser absorbing element, in accordance with some embodiments of this disclosure.

FIG. 2D shows another exemplary implementation of a first laser absorbing element 204A, in accordance with some embodiments of this disclosure.

The first laser absorbing element 204A is similar to the laser absorbing elements 104, except as noted. The first laser absorbing element 204A includes an array of PV cells 238 (two of which are labeled). An outer portion 234 (e.g., a perimeter portion) of the laser absorbing element 204A includes markings 240 so the camera 106 (FIG. 1) can detect bounds (e.g., a perimeter 236) of the first laser absorbing element 204A. In the depicted embodiment, the markings 240 include a larger space or a darker space around the perimeter 236 of the first laser absorbing element 204A. The markings 240 are also between PV cells 238 in the outer portion 234 (e.g., the first three rows and columns and last three rows and columns), running longitudinally along a length of the first laser absorbing element 204A and laterally along a width of the first laser absorbing element 204A. The markings 240 form a border around four of the PV cells 238 in each corner of the first laser absorbing element 204A.

The laser circuitry 108 (FIG. 1) may use the camera 106 to detect the markings 240 and determine an orientation or a skew of the first laser absorbing element 204A. For example, if the markings 240 are normally oriented orthogonal (e.g., perpendicular) to each other (as shown), the markings 240 can be tracked as they move and bend (e.g., with the vest 128 in FIG. 1) to determine an instantaneous orientation of the first laser absorbing element 204A.

A surface area of the first laser absorbing element 204A per a given orientation may be calculated using known image processing techniques. For example, a height of the first laser absorbing element 204A seen by the camera 106 (e.g., the length (L) in the depicted embodiment) may be calculated using the following equation:

$$H_o = \frac{D \times H_s}{fl},$$

where $H_o$ is a height of the real object (e.g., the first laser absorbing element 204A), D is the distance to the real object, $H_s$ is a height of the object on a sensor of the camera 106 (i.e., a camera sensor), and fl is a focal length of the camera 106. Reference markers or fiducial markers may be placed within the field of view 130 (FIG. 1) of the camera 106 and used to determine the distance (D). The height of the object on a sensor ($H_s$) may be determined using a camera sensor having known dimensions and ratios. The focal length (fl) of the camera 106 is known. The same calculation can be used to determine a width of the first laser absorbing element 204A seen by the camera 106 (e.g., the width (W) in the depicted embodiment) by substituting width for height in the equation. Once the height and width are determined for the given orientation, the surface area can be calculated. The calculated height and width are what is seen by the camera 106, which will not always be the length (L) and width (W). The calculated height and width may be of the unobstructed portion 122B discussed in relation to FIGS. 1 and 2A. For example, in FIGS. 1 and 2A, the width seen by the camera would be the unobstructed width (W'). The height and width seen by the camera may differ than the length (L) and width (W) if the first laser absorbing element 204 is rotated or skewed in the field of view 130.

FIG. 2E shows another exemplary implementation of a second laser absorbing element 204B, in accordance with some embodiments of this disclosure.

The second laser absorbing element 204B is similar to the laser absorbing elements 104, except as noted. The second laser absorbing element 204B includes the array of PV cells 238. The outer portion 234 of the second laser absorbing element 204B includes perimeter features 242A so the laser circuitry 108 can use the camera 106 (FIG. 1) to detect the perimeter 236 of the second laser absorbing element 204B. In the depicted embodiment, the perimeter features 242A include two squares in each corner of the second laser absorbing element 204B. The squares are oriented diagonally such that the two squares create a line pointing to each corner.

The second laser absorbing element 204B includes identifying features 242B so the camera 106 can distinguish between the laser absorbing elements 104 (FIGS. 1 and 2A). In the depicted embodiment, the identifying features 242B include six squares to note that the second laser absorbing element 204B is a sixth laser absorbing element 104 of the laser absorbing elements 104. Bounding features 242C surround the identifying features 242B so the camera 106 can detect if all identifying features 242B are in the field of view 130, which prevents misidentification of the laser absorbing elements 104. For example, if all bounding features 242C are within the field of view 130, then the laser circuitry 108 may rely on the identifying features 242B identify the sixth laser absorbing element 104. If some of the bounding features 242C are outside of the field of view 130, then the laser circuitry 108 may not be able to rely on the identifying features 242B.

In some embodiments, the features 242A-C may be formed by omitting certain cells in the array of PV cells 238. In some embodiments, the certain cells in the array of PV cells 238 may be PV cells 238 that are darker (or lighter) than other PV cells 238. In some embodiments, the perimeter features 242A-C may include fiducial markers, quick response (QR) codes, or other patterns in the PV cells 238.

Figure 3:
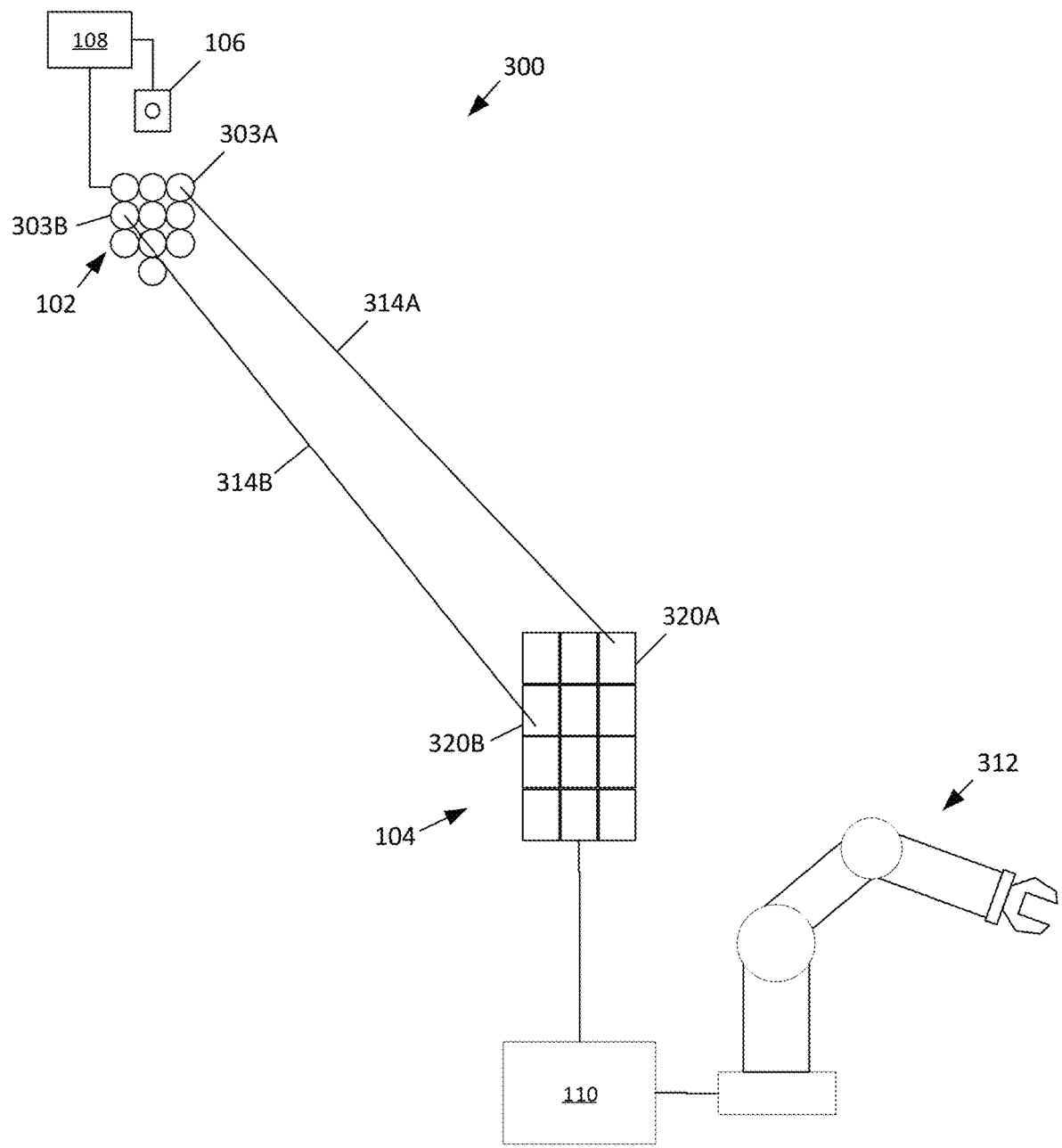
FIG. 3 shows another exemplary implementation of a laser wireless power system, in accordance with some embodiments of this disclosure.

FIG. 3 shows another exemplary implementation of a laser wireless power system 300, in accordance with some embodiments of this disclosure. In particular, FIG. 3 shows the laser wireless power system 300 (referred to as the system 300) providing power to a robotic arm 312.

The system 300 is similar to the system 100, except as noted. The system includes the lasers 102, the laser absorbing elements 104, the camera 106, and the absorbing element circuitry 110. The lasers 102 include a first laser 303A (referred to as the assigned laser in FIG. 1) and a second laser 303B. The laser absorbing elements 104 include a first laser absorbing element 320A and a second laser absorbing element 320B. The first and second lasers 303A and 303B scan the first and second laser absorbing elements 320A and 320B with a first laser beam 314A and a second laser beam 314B, respectively.

In the depicted embodiment, the laser absorbing elements 104 are stationary and do not move when the system is in operation. The absorbing element circuitry 110 connects the laser absorbing elements 104 to the robotic arm 312 and provide electrical power directly to the robotic arm 312 (i.e., without a battery). In some embodiments, the laser absorbing elements 104 may attach to the robotic arm 312 and may move with the robotic arm 312. In some embodiments, the system 300 may charge a battery connected to the robotic arm 312.

Figure 4:
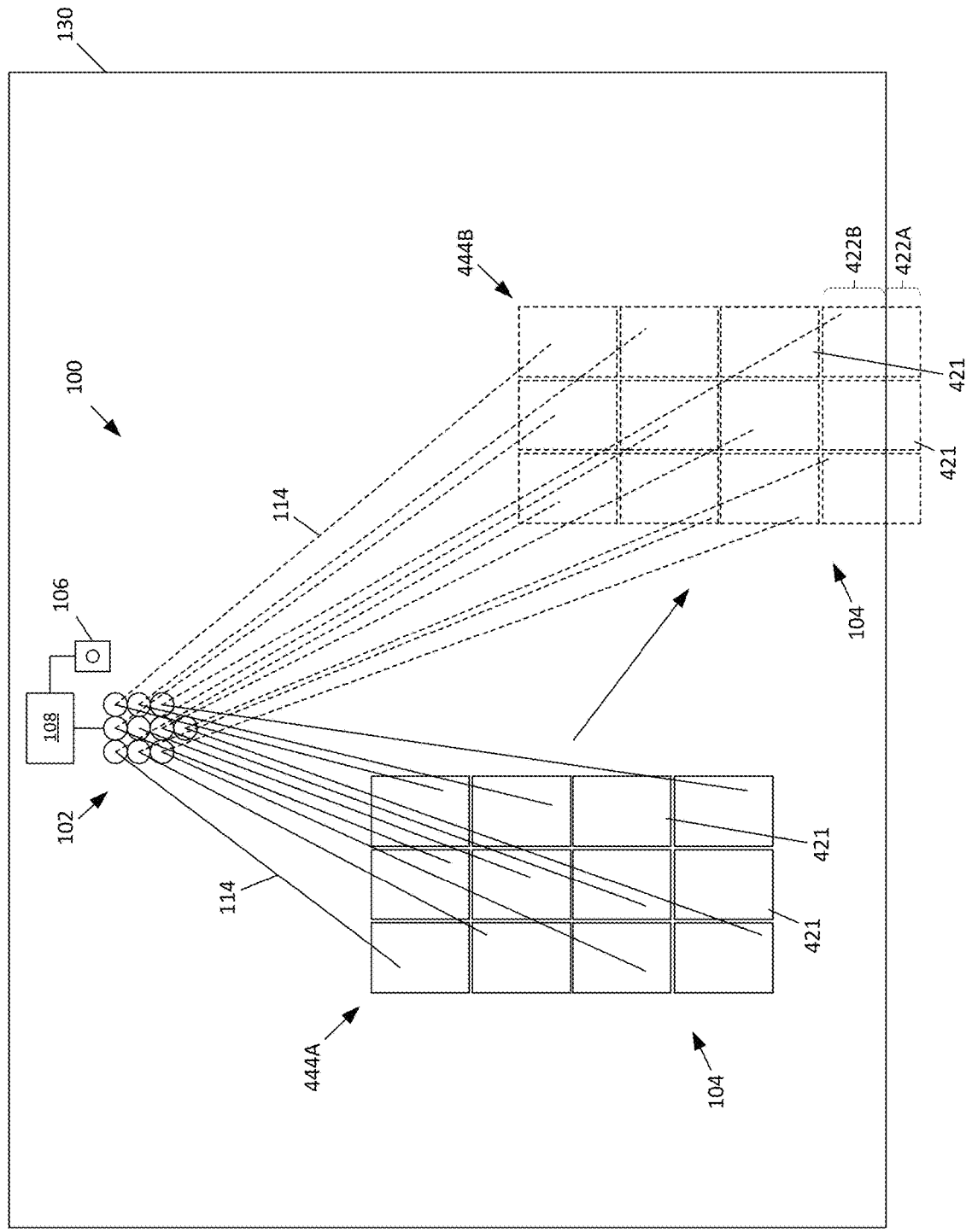
FIG. 4 shows an exemplary implementation of a laser wireless power system and moving laser absorbing elements, in accordance with some embodiments of this disclosure.

FIG. 4 shows an exemplary implementation of the laser wireless charging system 100 and moving laser absorbing elements 104, in accordance with some embodiments of this disclosure.

In the depicted embodiment, the laser circuitry 108 has already identified each laser absorbing element 104 of the laser absorbing elements 104. For example, the markings 240 or features 242A-C discussed in relation to FIGS. 2D and 2E are used to identify each laser absorbing element 104. The laser circuitry 108 assigned no more than one laser 102 to each laser absorbing element 104. The laser absorbing elements 104 include unassigned absorbing elements 421 since there are more laser absorbing elements 104 than lasers 102, such as discussed in relation to the "unused subset" of the laser absorbing elements 104 in FIG. 1.

The laser absorbing elements 104 start in a first position 444A, where the laser absorbing elements 104 are entirely in the field of view 130 of the camera 106. Each of the lasers 102 scan a laser absorbing element 104. During scanning, the laser absorbing elements 104 move from the first position 444A to a second position 444B and the laser circuitry 108 uses the camera 106 to track the laser absorbing elements 104. The laser circuitry 108 moves the laser beams 114 accordingly to continue scanning the laser absorbing elements 104 and providing power while they move to the second position 444B.

In the second position 444B, a subset of the laser absorbing elements 104 (e.g., shown as a bottom row), including one of the unassigned absorbing elements 421, has an obstructed portion 422A that is out of the field of view 130 and an unobstructed portion 422B that is within the field of view 130. The laser circuitry 108 calculates a surface area of the unobstructed portions 422B, such as discussed in relation to FIG. 2D. The laser circuitry 108 determines how much electrical power the unobstructed portions 422B may provide and then determines if the laser absorbing elements 104 being scanned by the lasers 102 will provide enough power. If more electrical power is needed, the laser circuitry 108 may reassign one of the lasers 102 scanning the unobstructed portions 422B to scan an unassigned absorbing element 421 that does not have an obstructed portion 422A. The laser circuitry 108 may continuously identify portions of the laser absorbing elements 104 within the line of sight of the assigned laser (e.g., unobstructed portions 422B), while the laser absorbing elements 104 move from the first position 444A to the second position 444B.

Figure 5:
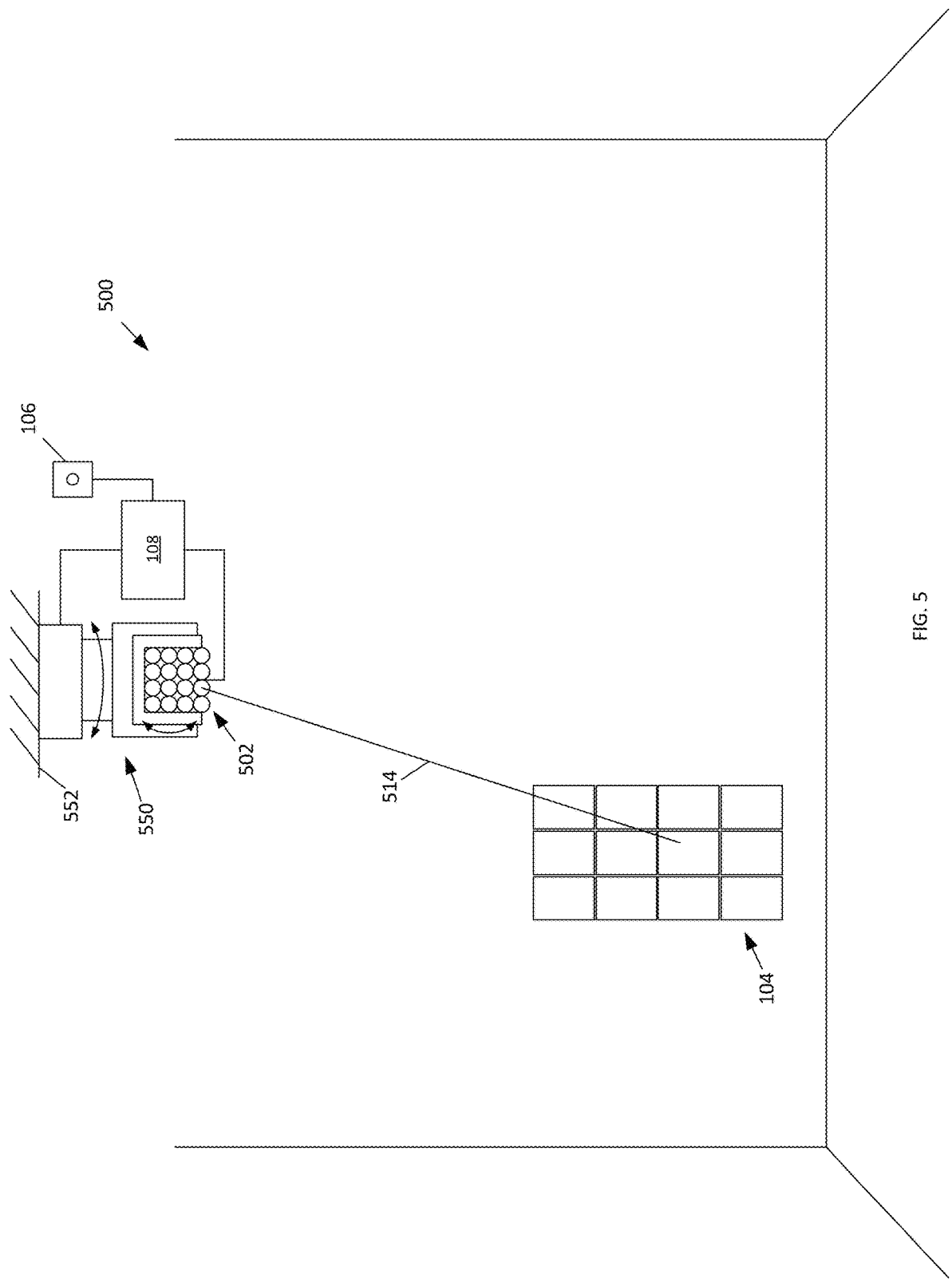
FIG. 5 shows another exemplary implementation of a laser wireless power system, in accordance with some embodiments of this disclosure.

FIG. 5 shows another exemplary implementation of a laser wireless power system 500, in accordance with some embodiments of this disclosure.

The laser wireless power system 500 (referred to as the system 500) is similar to the system 100, except as noted. The system includes a plurality of lasers 502, a motorized pan and tilt device 550 or motorized gimbal, the laser absorbing elements 104, the camera 106, and the laser circuitry 108. The lasers 502 are similar to the lasers 102, except there are more lasers 502 and the lasers are arranged in a four-by-four configuration. The lasers 502 attach to the motorized pan and tilt device 550, which rotates the lasers 502 about two axes. The pan and tilt device 550 is attached to a fixed surface, such as a ceiling 552. The laser circuitry 108 may move the motorized pan and tilt device 550 to have the lasers 502 track the laser absorbing elements 104, which may move as discussed in relation to FIG. 4. The motorized pan and tilt device 550 may ensure a laser beam 514 of each of the lasers 502 can reach most or all areas of the camera 106 field of view 130 (FIG. 4).

In the depicted embodiment, there are more lasers 502 than laser absorbing elements 104. For example, there are sixteen lasers 502 and twelve laser absorbing elements 104. In some embodiments, the additional lasers 502 may be used as spares or reserves in case a laser 502 malfunctions or overheats. In some embodiments, the additional lasers 502 may be used to scan an eleventh or twelfth laser absorbing element 104. For example, four of the twelve laser absorbing elements 104 may each have an unobstructed portion 122B (FIGS. 1 and 2A) below a threshold surface area (referred to as obstructed laser absorbing elements 104). If the obstructed laser absorbing elements 104 are not used, the remaining eight laser absorbing elements 104 may not be able to provide enough electrical power. The obstructed laser absorbing elements 104 may collectively provide enough electrical power when used with the remaining eight laser absorbing elements 104. Thus, the lasers 502 may be used to simultaneously scan all of the laser absorbing elements 104.

In some embodiments, the motorized pan and tilt device 550 may be attached to the camera 106 and be used to move the camera 106 instead of the lasers 502 to increase the field of view 130. In some embodiments, the lasers 502 and the camera 106 may each use the motorized pan and tilt device 550 so the laser absorbing elements 104 may move around a larger area. In some embodiments, the pan tilt device 550 may include any of an IMU, gyroscope, and encoder to orient the lasers 502 (or camera 106) and determine a position of the pan tilt device 550.

Figure 6:
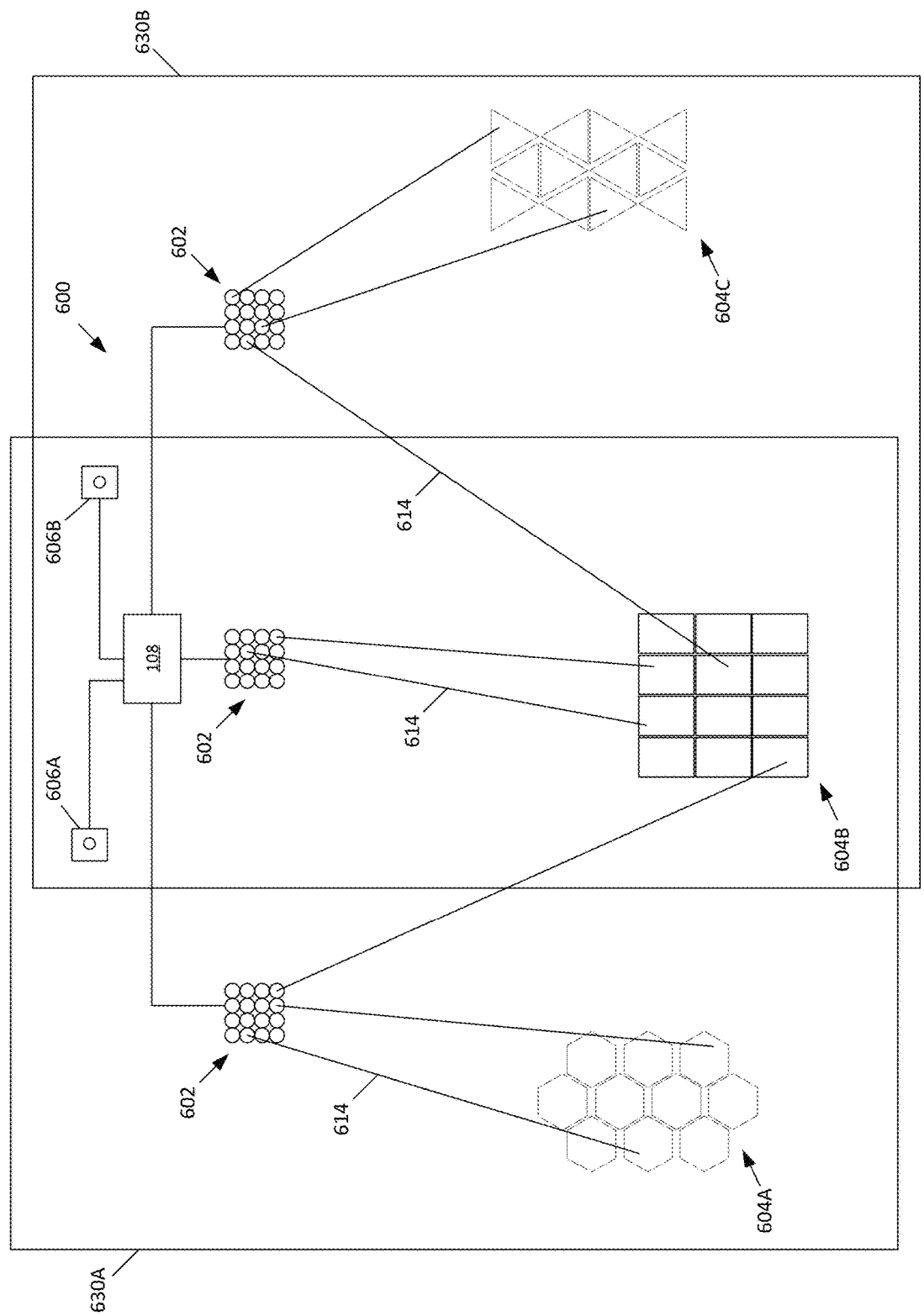
FIG. 6 shows another exemplary implementation of a laser wireless power system, in accordance with some embodiments of this disclosure.

FIG. 6 shows another exemplary implementation of a laser wireless power system 600, in accordance with some embodiments of this disclosure.

The laser wireless power system 600 (referred to as the system 600) is similar to the system 100, except as noted. The system 600 includes multiple pluralities of lasers 602 (three as shown), a first camera 606A, a second camera 606B, multiple arrays of laser absorbing elements 604 (e.g., a first array of laser absorbing elements 604A, a second array of laser absorbing elements 604B, and a third array of laser absorbing elements 604C), and the laser circuitry 108. Each of the pluralities of lasers 602 is similar to the lasers 502 discussed in FIG. 5. In some embodiments, the lasers 602 may be configured differently, such as the lasers 102 discussed in relation to FIG. 1.

The first array of laser absorbing elements 604A includes ten hexagon-shaped laser absorbing elements 604A arranged in a honeycomb pattern. The second array of laser absorbing elements 604B includes twelve rectangle-shaped laser absorbing elements 604B arranged in a four by three configuration. The third array of laser absorbing elements 604C includes twelve triangle-shaped laser absorbing elements 604C alternating in orientation such that back-to-back laser absorbing elements 604C form a diamond (or bowtie) pattern.

Each array of laser absorbing elements 604A-C has a corresponding plurality of lasers 602. Each plurality of lasers 602 has more lasers 602 than any one of the array of laser absorbing elements 604A-C. A laser beam 614 from one of the plurality of lasers 602 may be capable of scanning a laser absorbing element 604 of the first, second, or third array of laser absorbing elements 604A-C. For example, in the depicted embodiment, the laser beam 614 of a rightmost plurality of lasers 602 (as shown on the page) may scan a laser absorbing element 604B of the second array of laser absorbing elements 604B, even though the rightmost plurality of lasers 602 correspond to a third array of laser absorbing elements 604C. Thus, each of the pluralities of lasers 602 may provide laser power to multiple arrays of laser absorbing elements 604A-C.

The first camera 606A has a first field of view 630A. The second camera 606B has a second field of view 630B. The first and second fields of view 630A and 630B overlap. The laser circuitry 108 may stitch the field of views 630A and 630B together to create one large field of view, allowing the system 600 to track the arrays of laser absorbing elements 604A-C. The first and second cameras 606A and 606B may each be similar to the camera 106 discussed in relation to FIG. 1. In some embodiments, the first and second cameras 606A and 606B may be any combination of a still camera, a video camera, or an IR camera, to name a few examples. In some embodiments, the first camera 606A may be a still or video camera and the second camera 606B may be an IR camera. In such embodiments, the fields of view 630A and 630B may substantially overlap. For example, at least 85% of the first field of view 630A may overlap the second field of view 630B, such as at least 90%, such as at least 95%, such as at least 97%.

In some embodiments, one array of laser absorbing elements 604 (e.g., the second array of laser absorbing elements 604B) may be used with all pluralities of lasers 602. In such embodiments, the second array of laser absorbing elements 604B may move about the first and second fields of view 630A and 630B while the pluralities of lasers 602 scan the second array of laser absorbing elements 604B. The pluralities of lasers 602 help reduce or eliminate obstructed portions 422A (FIG. 4) as the second array of laser absorbing elements 604B changes position.

Figure 7A:
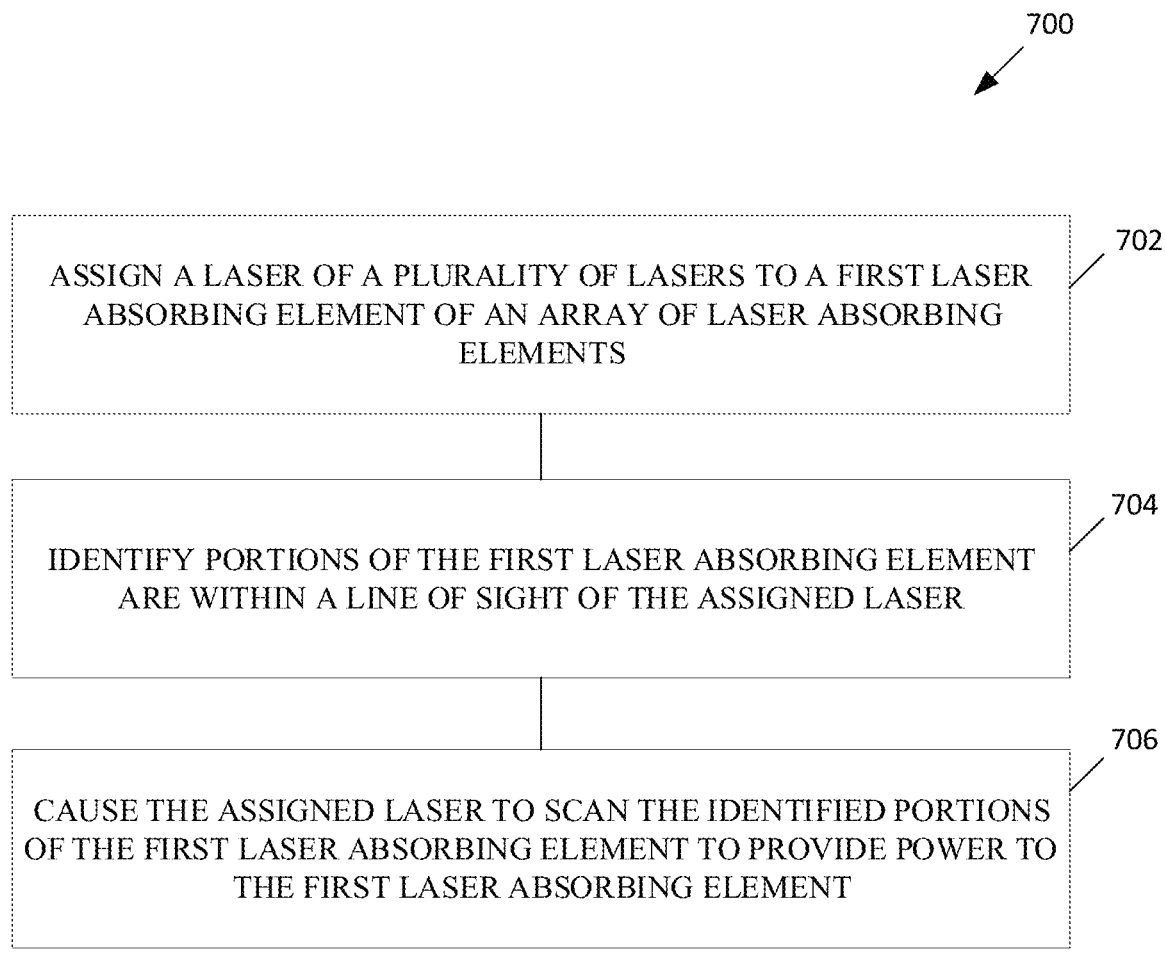
FIGS. 7A and 7B are flowcharts of detailed illustrative processes for laser wireless charging, in accordance with some embodiments of this disclosure.
Figure 7B:
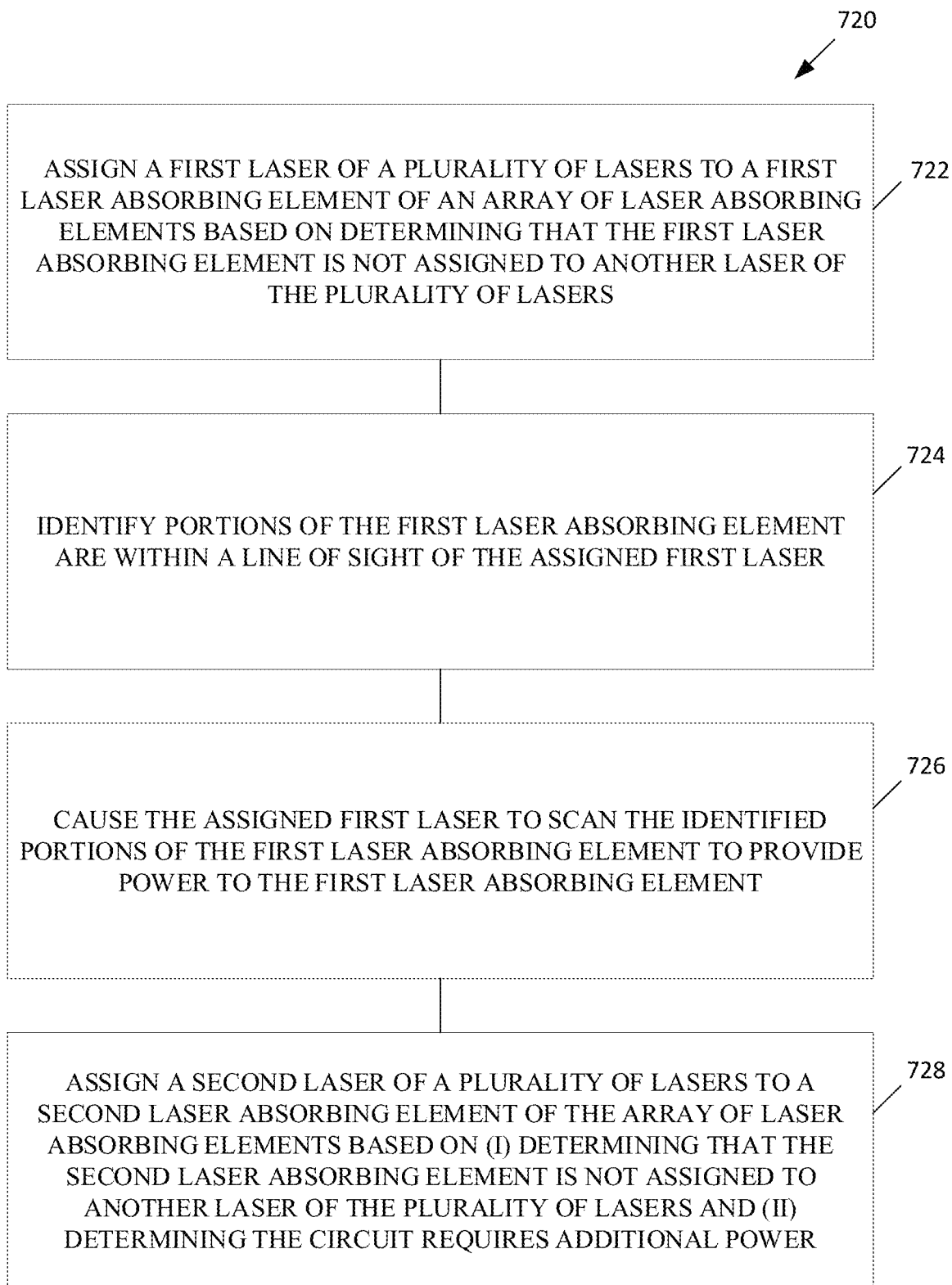

FIGS. 7A and 7B are flowcharts of a detailed illustrative processes for laser wireless charging, in accordance with some embodiments of this disclosure. The processes shown in FIGS. 7A and 7B may be implemented, in whole or in part, by one or more systems or devices described herein.

Referring to FIG. 7A, a process 700 starts at operation 702 with laser control circuitry (e.g., laser control circuitry 902 of FIG. 9) assigning a laser of a plurality of lasers (e.g., lasers 920 of FIG. 9) to a first laser absorbing element of an array of laser absorbing elements (e.g., laser absorbing elements 968 of FIG. 9), such as described above with respect to FIGS. 1-2A and 3-4. The process 700 continues to operation 704 with the laser control circuitry identifying portions of the first laser absorbing element are within a line of sight of the assigned laser, such as described above with respect to FIG. 1. The process continues to operation 706 with causing the assigned laser to scan the identified portions of the first laser absorbing element to provide power to the first laser absorbing element, such as described above with respect to FIGS. 1-2C and 4-5.

Referring to FIG. 7B, a process 720 begins at operation 722 with the laser control circuitry assigning a first laser of a plurality of lasers to a first laser absorbing element of an array of laser absorbing elements based on determining that the first laser absorbing element is not assigned to another laser of the plurality of lasers, such as described above with respect to FIGS. 1-2A and 3-4. The process 720 continues to operation 724 with the laser control circuitry identifying portions of the first laser absorbing element are within a line of sight of the assigned first laser, such as described above with respect to FIG. 1. The process 720 continues to operation 726 with the laser control circuitry causing the assigned first laser to scan the identified portions of the first laser absorbing element to provide power to the first laser absorbing element, such as described above with respect to FIGS. 1-2C and 4-5. In some embodiments, the array of laser absorbing elements are configured to provide power to a circuit (e.g., power control circuitry 970 and battery 972 in FIG. 9). The process 720 continues to operation 728 with the laser control circuitry assigning a second laser of a plurality of lasers to a second laser absorbing element of the array of laser absorbing elements based on (i) determining that the second laser absorbing element is not assigned to another laser of the plurality of lasers and (ii) determining the circuit requires additional power, such as described above with respect to FIGS. 4-5.

Figure 8A:
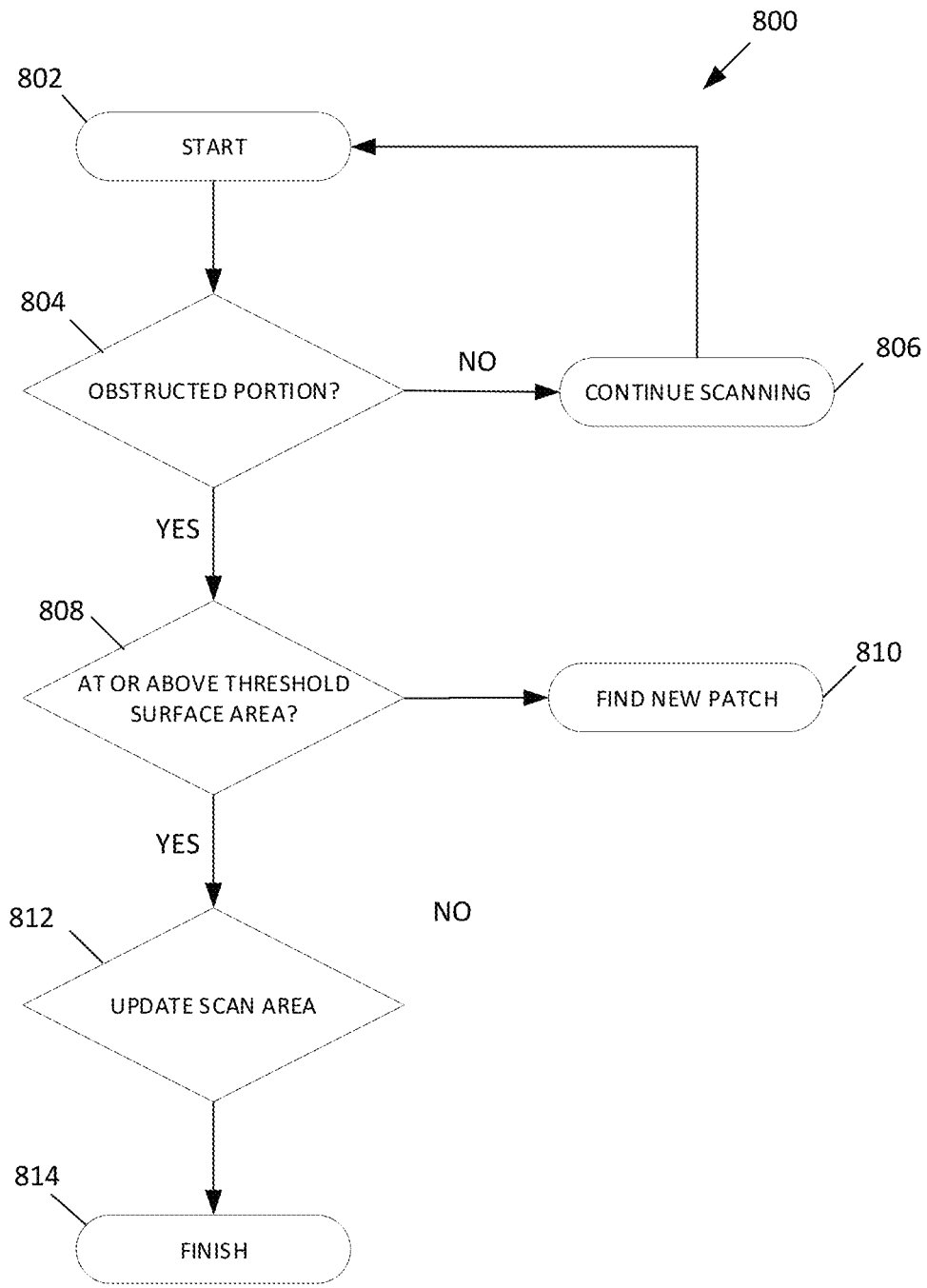
FIG. 8A is a flowchart of a process for determining whether to update a scan area of a laser absorbing element, in accordance with some embodiments of this disclosure.

FIG. 8A is a flowchart of a process 800 for determining whether to update a scan area of a laser absorbing element, in accordance with some embodiments of this disclosure.

Figure 9:
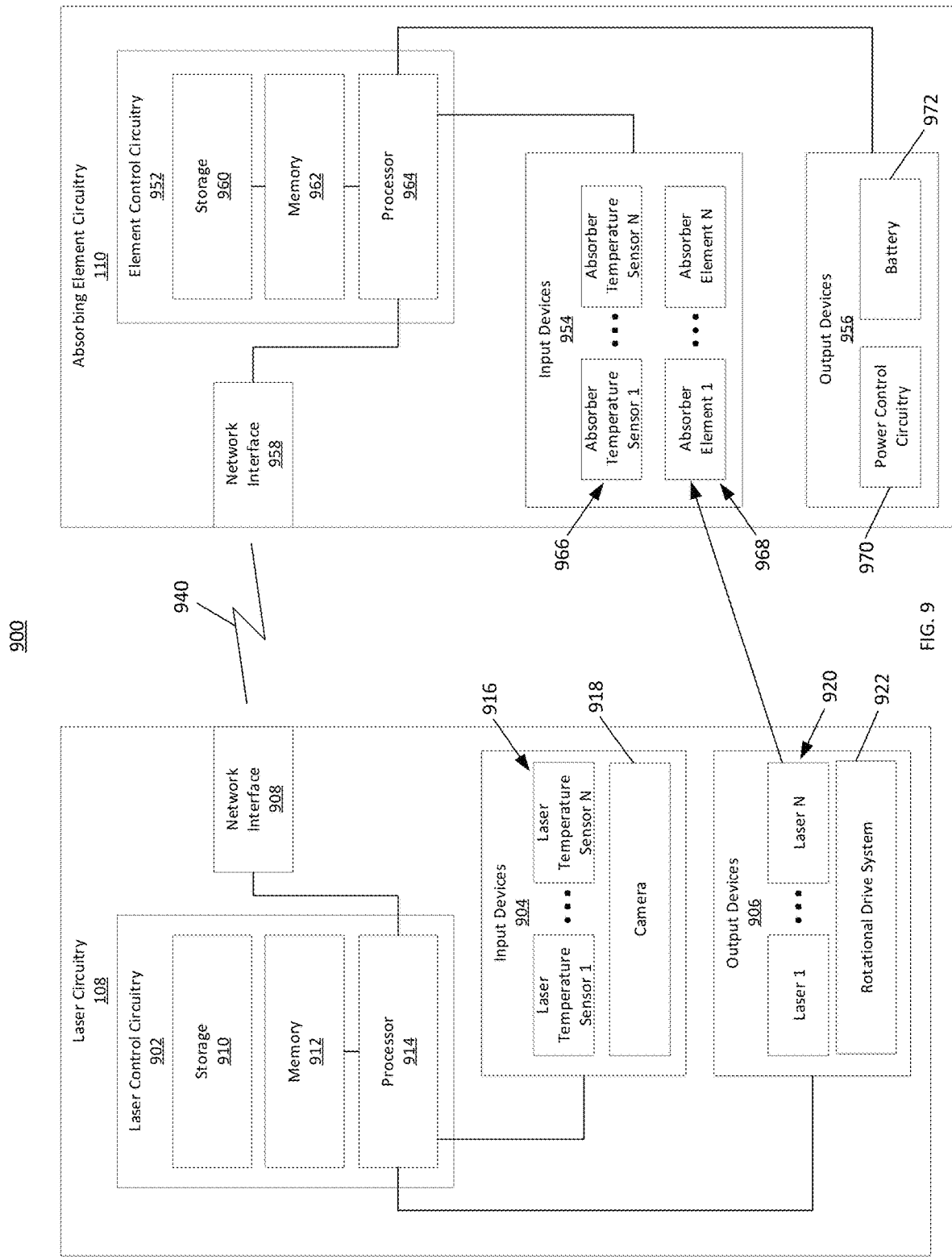
FIG. 9 shows an example of a laser wireless charging system controller, in accordance with some embodiments of this disclosure.

The process 800 starts at operation 802 with scanning a laser absorbing element (e.g., a laser absorbing element of the laser absorbing elements 968 of FIG. 9), with a laser (e.g., a laser of the plurality of lasers 920 of FIG. 9), such as described above with respect to FIGS. 1-7B.

The process 800 continues with operation 804 with laser control circuitry (e.g., laser control circuitry 902 of FIG. 9) determining if a portion of the laser absorbing element is obstructed from a line of sight of the laser, such as described above with respect to FIGS. 1-2B, 2D, and 4-6. If the portion of the laser absorbing element is not obstructed from a line of sight of the laser, then process 800 continues to operation 806 and the laser continues to scan. The process 800 may also return to operation 802. If the portion of the laser absorbing element is obstructed from a line of sight of the laser, then process 800 continues to operation 808 with determining if an unobstructed portion of the laser absorbing element is at or above a threshold surface area, such as described above with respect to FIGS. 1-2A and 5.

If the unobstructed portion of the laser absorbing element is not at or above the threshold surface area, the process 800 continues to operation 810 and the laser control circuitry determines a different laser absorbing element to scan, such as described above with respect to FIG. 2A. Once the laser is assigned to the different laser absorbing element, the process 800 may return to operation 802. If the unobstructed portion of the laser absorbing element is at or above the threshold surface area, the process 800 continues to operation 812 and the laser control circuitry updates the scan area to exclude the portion of the laser absorbing element that is obstructed from a line of sight of the laser, such as described above with respect to FIGS. 1 and 2A. The process 800 finishes at operation 814 with the laser scanning the updated portion of the laser absorbing element with the laser. The process 800 may return to operation 802.

Figure 8B:
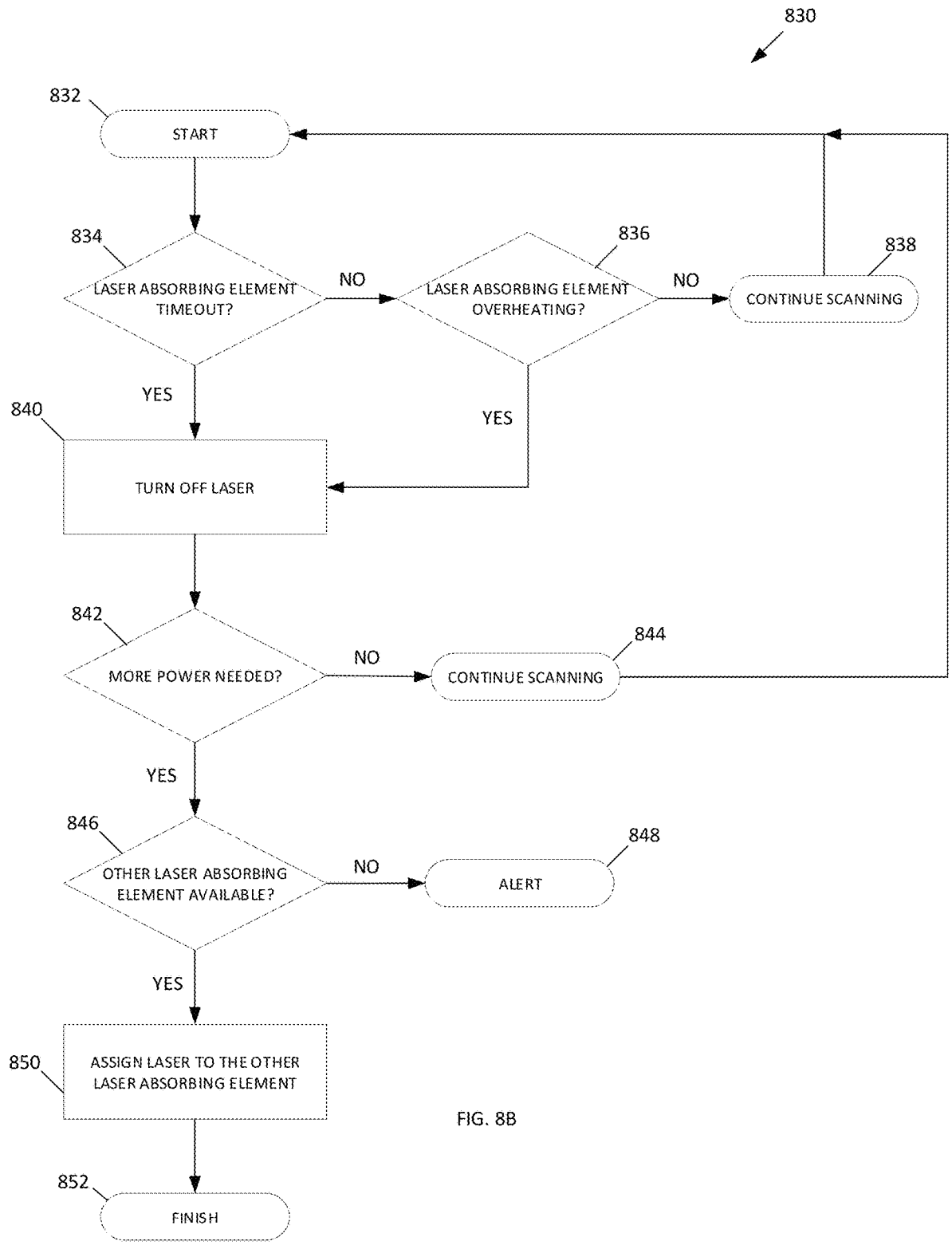
FIG. 8B is a flowchart of a process for determining whether to update a laser absorbing element assigned to a laser, in accordance with some embodiments of this disclosure.

FIG. 8B is a flowchart of a process for determining whether to update a laser absorbing element assigned to a laser, in accordance with some embodiments of this disclosure.

The process 830 starts at operation 832 with scanning a laser absorbing element of an array of laser absorbing elements using a laser, such as described above with respect to FIGS. 1-7B. The laser scans the laser absorbing element with a laser beam.

The process 830 continues with operation 834 with absorbing element control circuitry (e.g., absorbing element control circuitry 952 of FIG. 9) determining if the laser absorbing element has exceeded a timeout, or has been scanned by the laser for a minimum time threshold, such as described above with respect to FIG. 1. If the laser absorbing element has not timed out, then the process 830 proceeds to operation 836 with the absorbing element control circuitry determining if the laser absorbing element is overheating, such as described in relation to FIG. 1. If the laser absorbing element is not overheating, then process 830 continues to operation 838 and the laser beam continues to scan. The process 830 may also return to operation 832. If the minimum time threshold has been exceeded, the process 830 proceeds to operation 840 with the laser control circuitry turning off the laser to stop the laser beam from scanning the laser absorbing element.

The process 830 continues to operation 842 with the absorbing element control circuitry determining if the remaining array of laser absorbing elements needs to provide more electrical power without the laser absorbing element being scanned, such as described above with respect to FIGS. 4-5. If the array of laser absorbing elements does not need to provide more electrical power, then process 830 continues to operation 844 and laser beam or beams (e.g., one or more remaining laser beams that remain active) continues or continue to scan. The process 830 may also return to operation 832. If the laser absorbing element does need to provide more electrical power, then process 830 continues to operation 846 with the laser control circuitry and the absorbing element control circuitry determining if another laser absorbing element is available.

If no other laser absorbing element is available, then the process 830 continues to operation 848 with presenting an alert that more electrical power is needed and no laser absorbing elements are available, such as through a VR headset (e.g., VR headset 112 in FIG. 1) or another display. If another laser absorbing element is available, then the process continues to operation 850 with the laser control circuitry assigning the laser to the other laser absorbing element. The process 830 finishes at operation 852 with the laser scanning the other laser absorbing element with the laser beam. The process 830 may return to operation 832.

Figure 8C:
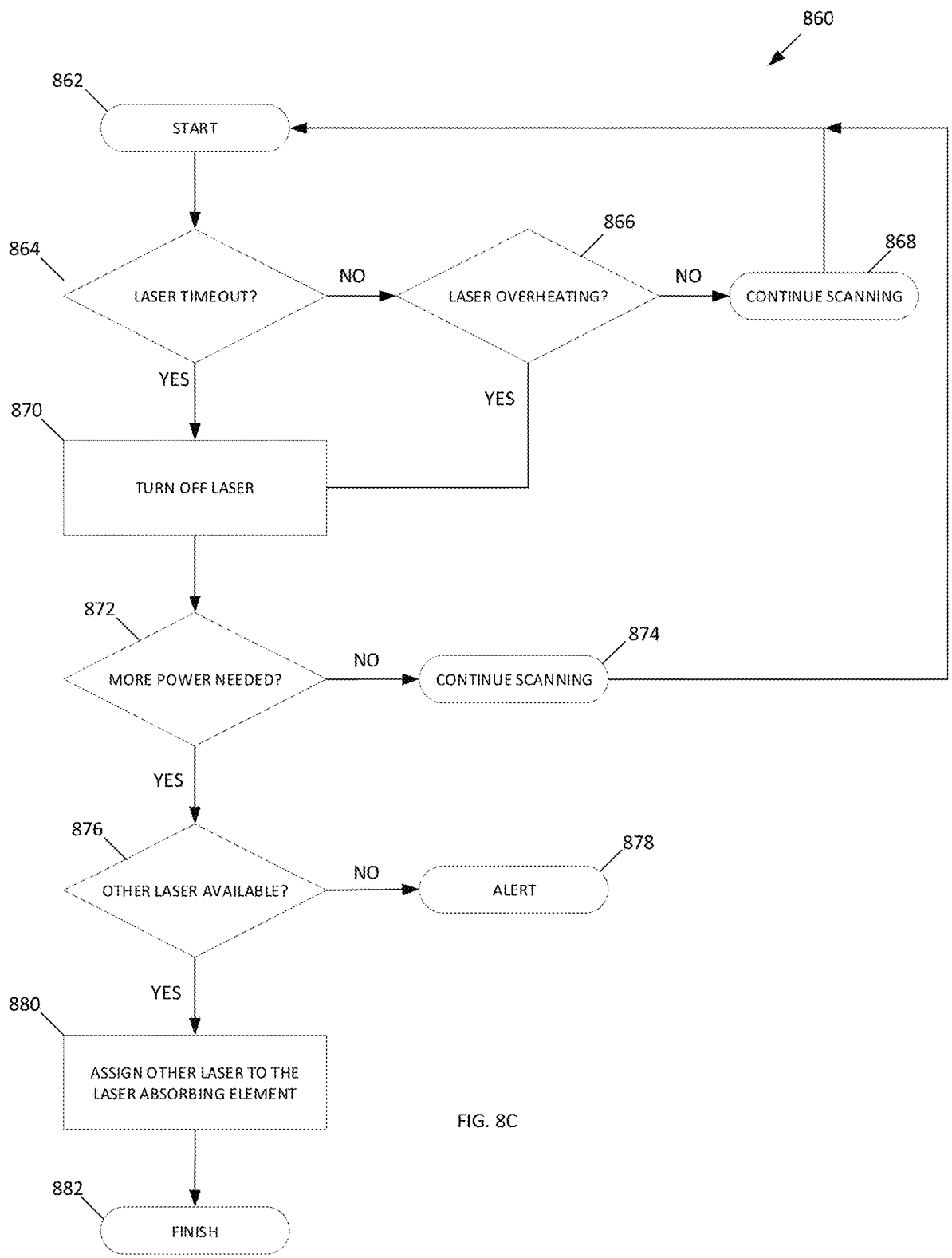
FIG. 8C is a flowchart of a process for determining whether to update a laser assigned to a laser absorbing element, in accordance with some embodiments of this disclosure.

FIG. 8C is a flowchart of a process for determining whether to update a laser assigned to a laser absorbing element, in accordance with some embodiments of this disclosure.

The process 860 starts at operation 862 with scanning a laser absorbing element using a laser of a plurality of lasers, such as described above with respect to FIGS. 1-7B. Each laser of the plurality of lasers has a laser beam that may scan the laser absorbing element.

The process 860 continues with operation 864 with the laser control circuitry determining if the laser has exceeded a timeout, or has been scanning for a minimum time threshold, such as described above with respect to FIG. 1. If the laser has not timed out, then the process 860 proceeds to operation 866 with the laser control circuitry determining if the laser is overheating, such as described in relation to FIG. 5. If the laser is not overheating, then process 860 continues to operation 868 and the laser beam continues to scan. The process 860 may also return to operation 862. If the minimum time threshold has been exceeded, the process 860 proceeds to operation 870 with turning off the laser to stop the laser beam from scanning the laser absorbing element.

The process 860 continues to operation 872 with the laser control circuitry and the absorbing element control circuitry determining if the laser absorbing element needs to provide more electrical power, such as described above with respect to FIGS. 4-5. If the laser absorbing element does not need to provide more electrical power, then process 860 continues to operation 874 and the laser (e.g., laser that remains active after step 840) continues to scan. The process 860 may also return to operation 862. If the laser absorbing element does need to provide more electrical power, then process 860 continues to operation 876 with the laser control circuitry determining if another laser is available (e.g., not assigned to a laser absorbing element).

If no other laser is available, then the process 860 continues to operation 878 with presenting an alert that more electrical power is needed and no lasers are available. If another laser is available, then the process continues to operation 880 with the laser control circuitry assigning the another laser to the laser absorbing element. The process 860 finishes at operation 882 with the another laser scanning the laser absorbing element with its laser beam. The process 860 may return to operation 862.

FIG. 9 shows an example of a laser wireless power system controller 900, in accordance with some embodiments of this disclosure.

The system controller 900 includes the laser circuitry 108 and the absorbing element circuitry 110. The laser circuitry 108 includes a laser control circuitry 902, input devices 904, output devices 906, and a network interface 908. The laser control circuitry 902 includes a storage 910, a memory 912, and a processor 914. The processor 914 is configured to process computer-executable instructions, e.g., stored in the memory 912 or storage 910, and to cause the system controller 900 to perform methods and processes as described herein, for example with respect to FIG. 7A-8C.

The processor 914 is included to be representative of a single central processing unit (CPU), multiple CPUs, a single CPU having multiple processing cores, and other forms of processing architecture capable of executing computer-executable instructions.

The input devices 904 include laser temperature sensors 916 and a camera 918. The laser temperature sensors 916 may include the laser temperature sensors 124 discussed in relation to FIG. 1. The camera 918 may include any of the camera 106 discussed in relation to FIGS. 1 and 3-5 or the first and second cameras 606A and 606B discussed in relation to FIG. 6.

The output devices 906 include lasers 920 and a rotational drive system 922. The lasers 920 may include any of the lasers 102 discussed in relation to FIGS. 1, 3, and 4, the lasers 502 discussed in relation to FIG. 5, and the lasers 602 discussed in relation to FIG. 6. The rotational drive system 922 may include the motorized pan and tilt device 550 discussed in relation to FIG. 5.

The network interface 908 provides the laser circuitry 108 with access to external networks, such as a network 940. In some implementations, network interface 908 may include one or more of a receiver, a transmitter, or a transceiver. The network 940 may be a local area network (LAN), a wide area network (WAN), the Internet, a cellular network, a satellite communication network, and the like.

The absorbing element circuitry 110 includes absorbing element control circuitry 952, input devices 954, output devices 956, and a network interface 958. The absorbing element control circuitry 952 includes a storage 960, a memory 962, and a processor 964. The processor 964 may be configured similar to the processor 914.

The input devices 954 include absorber temperature sensors 966 and laser absorbing elements 968. The absorber temperature sensors 966 may include the absorbing element temperature sensors 126 discussed in relation to FIG. 1. The laser absorbing elements 968 may include any of the laser absorbing elements 104 discussed in relation to FIGS. 1-2C and 3-5, the first and second laser absorbing elements 204A and 204B discussed in relation to FIGS. 2D and 2E, and the first, second, and third arrays of laser absorbing elements 604A-C discussed in relation to FIG. 6. The lasers 920 scan the laser absorbing elements 968, which convert laser power to electrical power.

The output devices 956 include a power control circuitry 970 and a battery 972. The power control circuitry 970 may include voltage step-downs, voltage step-ups, transistors, capacitors, DC to DC converters, or other electrical components to distribute the electrical power outputted by the laser absorbing elements 968. The battery 972 may be charged by the electrical power outputted by the laser absorbing elements 968, and may connect to the power control circuitry 970.

The network interface 958 connects the absorbing element circuitry 110 to the laser circuitry 108 through the network 940. The absorbing element circuitry 110 may communicate a status of the laser absorbing elements 968 to the laser circuitry 108. The status may include information such as whether the laser absorbing elements 968 have been scanned more than a minimum time threshold (e.g., a timeout) or exceeds an element temperature threshold, such as discussed in relation to FIG. 1.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    determining portions of a first laser absorbing element of an array of laser absorbing elements are (i) within a line of sight of a laser of a plurality of lasers and (ii) at or above a threshold surface area;
    based at least in part on determining the portions of the first laser absorbing element are at or above the threshold surface area, assigning the laser of the plurality of lasers to the first laser absorbing element; and
    causing the assigned laser to scan the portions of the first laser absorbing element to provide power to the first laser absorbing element.

2. The method of claim 1, wherein assigning the assigned laser of the plurality of lasers is based on determining that the first laser absorbing element is not assigned to another laser of the plurality of lasers.

3. The method of claim 1, further comprising providing power to the portions of the first laser absorbing element while the first laser absorbing element is moving.

4. The method of claim 3, wherein providing power to the portions of the first laser absorbing element while the first laser absorbing element is moving comprises continuously identifying portions of the first laser absorbing element within the line of sight of the assigned laser.

5. The method of claim 1, wherein:
    determining portions of a first laser absorbing element of an array of laser absorbing elements are (i) within a line of sight of a laser of a plurality of lasers and (ii) at or above a threshold surface area comprises determining, at a first time, that first portions of the first laser absorbing element of an array of laser absorbing elements are (i) within a line of sight of a laser of a plurality of lasers and (ii) at or above a threshold surface area;
    causing the assigned laser to scan the portions of the first laser absorbing element to provide power to the first laser absorbing element comprises causing the assigned laser to scan the first portions of the first laser absorbing element; and
    the method further comprises:
        determining, at a second time, second portions of the first laser absorbing element are below the threshold surface area; and
        causing the assigned laser to stop providing power to the first laser absorbing element based on the second portions of the first laser absorbing element being below the threshold surface area.

6. The method of claim 5, further comprising assigning the assigned laser to a second laser absorbing element of the array of laser absorbing elements based on determining that the second laser absorbing element is not assigned to another laser of the plurality of lasers.

7. The method of claim 5, further comprising:
    determining portions of a second laser absorbing element are (i) within a line of sight of the assigned laser and (ii) at or above the threshold surface area; and
    based at least in part on determining the portions of the second laser absorbing element are at or above the threshold surface area, assigning the assigned laser to the second laser absorbing element.

8. The method of claim 1, further comprising causing the assigned laser to stop providing power to the first laser absorbing element based on the first laser absorbing element being scanned by the assigned laser for a predetermined period of time.

9. The method of claim 1, further comprising causing the assigned laser to stop providing power to the first laser absorbing element based on a temperature of the first laser absorbing element exceeding a predetermined temperature threshold.

10. The method of claim 1, further comprising causing the assigned laser to stop providing power to the first laser absorbing element based on the assigned laser providing power for a predetermined period of time.

11. The method of claim 1, further comprising causing the assigned laser to stop providing power to the first laser absorbing element based on a temperature of the assigned laser exceeding a predetermined temperature threshold.

12. The method of claim 1, further comprising powering a laser absorbing element circuit using the power provided to the first laser absorbing element, wherein the powered laser absorbing element circuit is used to charge a battery.

13. The method of claim 1, further comprising powering a laser absorbing element circuit using the power provided to the first laser absorbing element, wherein the powered laser absorbing element circuit is used to power an augmented reality or virtual reality headset.

14. A method comprising:
assigning a first laser of a plurality of lasers to a first laser absorbing element of an array of laser absorbing elements based on determining that the first laser absorbing element is not assigned to another laser of the plurality of lasers;
identifying portions of the first laser absorbing element are within a line of sight of the assigned first laser;
determining a scan pattern for the identified portions of the first laser absorbing element;
causing the assigned first laser to scan the identified portions of the first laser absorbing element along the scan pattern to provide power to the first laser absorbing element, wherein the array of laser absorbing elements are configured to provide power to a circuit; and
assigning a second laser of the plurality of lasers to a second laser absorbing element of the array of laser absorbing elements based on (i) determining that the second laser absorbing element is not assigned to another laser of the plurality of lasers and (ii) determining the circuit requires additional power.

15. The method of claim 14, further comprising causing the assigned first laser to stop providing power to the first laser absorbing element based on the assigned first laser providing power for a predetermined period of time.

16. The method of claim 14, further comprising causing the assigned first laser to stop providing power to the first laser absorbing element based on a temperature of the assigned first laser exceeding a predetermined temperature threshold.

17. A system, comprising:
an array of laser absorbing elements, wherein each laser absorbing element of the array of laser absorbing elements is configured to receive power via laser input;
a plurality of lasers configured to provide power to the array of laser absorbing elements;
a camera configured to capture an image of the array of laser absorbing elements; and
a control circuitry configured to:
determine portions of a first laser absorbing element of the array of laser absorbing elements are (i) within a line of sight of a laser of the plurality of lasers and (ii) at or above a threshold surface area;
based at least in part on (i) determining the portions of the first laser absorbing element are at or above the threshold surface area and (ii) determining that the first laser absorbing element is not assigned to another laser of the plurality of lasers, assign the laser of the plurality of lasers to the first laser absorbing element; and
cause the assigned laser to scan the portions of the first laser absorbing element to provide the power to the first laser absorbing element.

18. The system of claim 17, wherein the array of laser absorbing elements are an array of photovoltaic cells.

19. The system of claim 17, wherein the array of laser absorbing elements are attached to a garment.

* * * * *